US00RE39758E

(19) United States
(12) Reissued Patent
Horst et al.

(10) Patent Number: US RE39,758 E
(45) Date of Reissued Patent: Aug. 7, 2007

(54) REMOTE CONTROL SYSTEM FOR A LOCOMOTIVE

(75) Inventors: Folkert Horst, Pierrefonds (CA); Oleh Szklar, St-Hubert (CA); Kelly Doig, Ottawa (CA); George R. Cass, Montreal (CA); Jean L. Bousquet, Montreal (CA)

(73) Assignee: Cattron Intellectual Property Corporation, Sharpsville, PA (US)

(21) Appl. No.: 11/274,719

(22) Filed: Nov. 14, 2005

Related U.S. Patent Documents

Reissue of:
(64) Patent No.: 5,511,749
Issued: Apr. 30, 1996
Appl. No.: 08/221,704
Filed: Apr. 1, 1994

U.S. Applications:
(63) Continuation of application No. 10/374,590, filed on Feb. 26, 2003, now Pat. No. Re. 39,011.

(30) Foreign Application Priority Data

Mar. 31, 1994 (CA) ..... 2,120,454

(51) Int. Cl.
*B61L 3/00* (2006.01)

(52) U.S. Cl. ..... 246/187 A; 246/182 C; 246/182 B; 246/187 B; 104/295; 104/300

(58) Field of Classification Search ..... 246/167 R, 246/182 R, 182 B, 183, 186, 187 R, 187 A, 246/187 B; 701/19, 20; 104/295; 340/825.69, 340/825.62, 825.72
See application file for complete search history.

(56) References Cited

U.S. PATENT DOCUMENTS 733,035 A 7/1903 Harding
1,360,150 A 11/1920 Shannon
1,437,637 A 12/1922 Dunkelberger
1,515,948 A 11/1924 Hammond, Jr.
1,653,172 A 12/1927 Hammond, Jr.

(Continued)

FOREIGN PATENT DOCUMENTS

| | | |
|---|---|---|
| CA | 670 272 | 9/1963 |
| CA | 1 245 744 | 11/1988 |
| DE | 15 80 940 | 1/1971 |
| DE | 20 52 009 | 4/1972 |
| DE | 21 60 494 | 7/1973 |

(Continued)

OTHER PUBLICATIONS

LCS BP Presentation "Locomotive Control System Symington Yard", Mar. '92.*

"Locomotive Control System, LCS–Beltpack, Flat Yard Application, CN Rail", Aug. '92.*

"A Description Of Operation For Vapor Pacesetter* II dual mode Nos. 17466866–10, –11, –12," Technical Manual No. TM3–SC–2 & 17431524, –01 Amplifier Interface, Vapor Transportation Systems, Feb. 27, 1979, 48 pages.

Angold, J. A., "Experience with a Long Distance Unit Coal Train," Contributed by the Intersociety Committee on Transportation for presentation at the Intersociety Conference on Transportation, Atlanta, Georgia, Jul. 14–18, 1975, pp. 1–7.

(Continued)

*Primary Examiner*—Mark T. Le
(74) *Attorney, Agent, or Firm*—Zagorin O'Brien Graham LLP

(57) ABSTRACT

A locomotive control system comprising a remote transmitter issuing RF binary coded commands and a slave controller mounted on the locomotive that decodes the transmission and operates in dependence thereof various actuators to carry into effect the commands of the ground based operator.

12 Claims, 17 Drawing Sheets

U.S. PATENT DOCUMENTS

| | | | |
|---|---|---|---|
| 1,765,173 | A | 6/1930 | Morrow |
| 1,788,815 | A | 1/1931 | Tubach |
| 1,816,628 | A | 7/1931 | Williams et al. |
| 1,923,499 | A | 8/1933 | Naken |
| 1,929,297 | A | 10/1933 | Webb |
| 2,235,112 | A | 3/1941 | Pulaski |
| 2,257,473 | A | 9/1941 | McKeige et al. |
| 2,278,358 | A | 3/1942 | McKeige et al. |
| 2,331,003 | A | 10/1943 | Smith |
| 2,447,669 | A | 8/1948 | Riley |
| 2,513,342 | A | 7/1950 | Marshall |
| 2,523,662 | A | 9/1950 | Miller |
| 2,576,424 | A | 11/1951 | Sunstein |
| 2,643,369 | A | 6/1953 | Manley et al. |
| 2,649,835 | A | 8/1953 | Lierley |
| 2,708,885 | A | 5/1955 | Smith et al. |
| 2,709,773 | A | 5/1955 | Getting et al. |
| 2,743,678 | A | 5/1956 | Hibbard |
| 2,768,331 | A | 10/1956 | Cetrone |
| 2,769,601 | A | 11/1956 | Hagopian et al. |
| 2,780,300 | A | 2/1957 | Beyer |
| 2,832,426 | A | 4/1958 | Seargeant |
| 2,948,234 | A | 8/1960 | Hughson |
| 2,951,452 | A | 9/1960 | Karlet |
| 2,961,640 | A | 11/1960 | von Behren |
| 2,993,299 | A | 7/1961 | Dingee, Jr. et al. |
| 2,998,513 | A | 8/1961 | Taczak et al. |
| 3,029,893 | A | 4/1962 | Mountjoy |
| 3,072,785 | A | 1/1963 | Hailes |
| 3,086,319 | A | 4/1963 | Frisbie et al. |
| 3,096,056 | A | 7/1963 | Allison |
| 3,201,899 | A | 8/1965 | Toteff et al. |
| 3,205,618 | A | 9/1965 | Heytow |
| 3,218,454 | A | 11/1965 | Hughson |
| 3,227,870 | A | 1/1966 | Joyce |
| 3,229,086 | A | 1/1966 | Allison |
| 3,239,962 | A | 3/1966 | Toteff et al. |
| 3,253,143 | A | 5/1966 | Hughson |
| 3,263,625 | A | 8/1966 | Midis et al. |
| 3,268,727 | A | 8/1966 | Shepard |
| 3,293,549 | A | 12/1966 | Patterson |
| 3,304,501 | A | 2/1967 | Ruthenberg |
| 3,312,818 | A | 4/1967 | Staples |
| 3,315,613 | A | 4/1967 | Leslie |
| 3,328,580 | A | 6/1967 | Staples |
| 3,355,584 | A | 11/1967 | Baughmao |
| 3,355,643 | A | 11/1967 | Benson |
| 3,361,082 | A | 1/1968 | Leslie |
| 3,368,073 | A | 2/1968 | Baughman |
| 3,374,035 | A | 3/1968 | Howard |
| 3,378,817 | A | 4/1968 | Vitt |
| 3,380,399 | A | 4/1968 | Southard et al. |
| 3,384,033 | A | 5/1968 | Ruff |
| 3,402,972 | A | 9/1968 | Cooper et al. |
| 3,530,434 | A | 9/1970 | Stites et al. |
| 3,539,226 | A | 11/1970 | Barber |
| 3,553,449 | A | 1/1971 | Hathaway |
| 3,583,771 | A | 6/1971 | Dressler, Jr. |
| 3,593,293 | A | 7/1971 | Rorholt |
| 3,601,605 | A | 8/1971 | Elder et al. |
| 3,610,363 | A | 10/1971 | Hartley |
| 3,628,463 | A | 12/1971 | Kwiatkowski et al. |
| 3,639,755 | A | 2/1972 | Wrege |
| 3,646,613 | A | 2/1972 | Matsumoto et al. |
| 3,650,216 | A | 3/1972 | Harwick et al. |
| 3,652,937 | A | 3/1972 | Garrott |
| 3,655,962 | A | 4/1972 | Koch |
| 3,660,653 | A | 5/1972 | Peterson |
| 3,686,447 | A | 8/1972 | Takalo |
| 3,687,082 | A | 8/1972 | Burke, Jr. |
| 3,694,650 | A | 9/1972 | Coiner |
| 3,696,758 | A | 10/1972 | Godinez, Jr. |
| 3,728,565 | A | 4/1973 | O'Callaghan |
| 3,811,112 | A | 5/1974 | Hoven et al. |
| 3,840,736 | A | 10/1974 | Asano et al. |
| RE28,306 | E | 1/1975 | Burke, Jr. |
| 3,870,939 | A | 3/1975 | Robert |
| 3,880,088 | A | 4/1975 | Grant |
| 3,885,137 | A | 5/1975 | Ooya et al. |
| 3,904,249 | A | 9/1975 | Crawford |
| 3,906,348 | A | 9/1975 | Willmott |
| 3,937,431 | A | 2/1976 | Güntner |
| 3,941,202 | A | 3/1976 | Sorkin |
| 3,964,701 | A | 6/1976 | Kacerek |
| 3,980,261 | A | 9/1976 | Hadaway |
| 3,994,237 | A | 11/1976 | Thomsen |
| 4,002,314 | A | 1/1977 | Barpal |
| 4,005,837 | A | 2/1977 | Grundy |
| 4,005,838 | A | 2/1977 | Grundy |
| 4,013,323 | A | 3/1977 | Burkett |
| 4,015,082 | A | 3/1977 | Matty et al. |
| 4,041,470 | A | 8/1977 | Slane et al. |
| 4,056,286 | A | 11/1977 | Burkett |
| 4,063,784 | A | 12/1977 | Pick |
| 4,066,299 | A | 1/1978 | Clements |
| 4,067,264 | A | 1/1978 | Ensink |
| 4,087,066 | A | 5/1978 | Bahker et al. |
| 4,093,161 | A | 6/1978 | Auer, Jr. |
| 4,095,764 | A | 6/1978 | Osada et al. |
| 4,108,501 | A | 8/1978 | Hintner et al. |
| 4,118,774 | A | 10/1978 | Franke |
| 4,133,504 | A | 1/1979 | Dobler et al. |
| 4,138,723 | A | 2/1979 | Nehmer et al. |
| 4,139,239 | A | 2/1979 | Staüble et al. |
| 4,156,864 | A | 5/1979 | Ingram |
| 4,162,486 | A | 7/1979 | Wyler |
| 4,164,872 | A | 8/1979 | Weigl |
| 4,179,624 | A | 12/1979 | Shindo et al. |
| 4,179,739 | A | 12/1979 | Virnot |
| 4,189,713 | A | 2/1980 | Duffy |
| 4,190,220 | A | 2/1980 | Hahn et al. |
| 4,235,402 | A | 11/1980 | Matty et al. |
| 4,241,331 | A | 12/1980 | Taeuber et al. |
| 4,266,273 | A | 5/1981 | Dobler et al. |
| 4,303,215 | A | 12/1981 | Maire |
| 4,331,917 | A | 5/1982 | Render et al. |
| 4,335,381 | A | 6/1982 | Palmer |
| 4,344,138 | A | 8/1982 | Frasier |
| 4,347,563 | A | 8/1982 | Paredes et al. |
| 4,347,569 | A | 8/1982 | Allen, Jr. et al. |
| 4,349,196 | A | 9/1982 | Smith, III et al. |
| 4,352,103 | A | 9/1982 | Slater |
| 4,370,614 | A | 1/1983 | Kawada et al. |
| 4,402,082 | A | 8/1983 | Cope |
| 4,410,983 | A | 10/1983 | Cope |
| 4,445,175 | A | 4/1984 | Cohen |
| 4,450,403 | A | 5/1984 | Dreiseitl et al. |
| 4,456,997 | A | 6/1984 | Spitza |
| 4,459,668 | A | 7/1984 | Inoue et al. |
| 4,463,289 | A | 7/1984 | Young |
| 4,464,659 | A | 8/1984 | Bergqvist |
| 4,475,159 | A | 10/1984 | Gerstenmaier et al. |
| 4,486,839 | A | 12/1984 | Mazur et al. |
| 4,487,060 | A | 12/1984 | Pomeroy |
| 4,495,578 | A | 1/1985 | Sibley et al. |
| 4,498,016 | A | 2/1985 | Earleson et al. |
| 4,513,604 | A | 4/1985 | Frantz et al. |
| 4,519,002 | A | 5/1985 | Amano |
| 4,525,011 | A | 6/1985 | Wilson |
| 4,553,723 | A | 11/1985 | Nichols et al. |
| 4,572,996 | A | 2/1986 | Hanschke et al. |

| | | | |
|---|---|---|---|
| 4,588,932 | A | 5/1986 | Riondel |
| 4,614,274 | A | 9/1986 | LaValle et al. |
| 4,620,280 | A | 10/1986 | Conklin |
| 4,621,833 | A | 11/1986 | Soltis |
| 4,641,243 | A | 2/1987 | Hartkopf et al. |
| 4,654,881 | A | 3/1987 | Dolikian et al. |
| 4,665,833 | A | 5/1987 | Fleishman et al. |
| 4,673,911 | A | 6/1987 | Yoshida |
| 4,687,258 | A | 8/1987 | Astley |
| 4,710,880 | A | 12/1987 | Zuber |
| 4,723,213 | A | 2/1988 | Kawata et al. |
| 4,726,299 | A | 2/1988 | Anderson |
| 4,733,616 | A | 3/1988 | Kurtz |
| 4,733,740 | A | 3/1988 | Bigowsky et al. |
| 4,768,740 | A | 9/1988 | Corrie |
| 4,775,116 | A | 10/1988 | Klein |
| 4,791,254 | A | 12/1988 | Polverari |
| 4,793,088 | A | 12/1988 | Fortuna |
| 4,854,529 | A | 8/1989 | Osada et al. |
| 4,870,419 | A | 9/1989 | Baldwin et al. |
| 4,872,195 | A | 10/1989 | Leonard |
| 4,893,240 | A | 1/1990 | Karkouti |
| 4,896,090 | A | 1/1990 | Balch et al. |
| 4,901,953 | A | 2/1990 | Munetika |
| 4,950,964 | A | 8/1990 | Evans |
| 4,955,304 | A | 9/1990 | Spenk et al. |
| 5,005,014 | A | 4/1991 | Jasinski |
| 5,012,749 | A | 5/1991 | Passage, Jr. |
| 5,018,009 | A | 5/1991 | Koerv |
| 5,029,532 | A | 7/1991 | Snead |
| 5,039,038 | A | 8/1991 | Nichols et al. |
| 5,050,505 | A | 9/1991 | Konno |
| 5,065,963 | A | 11/1991 | Usui et al. |
| 5,085,148 | A | 2/1992 | Konno |
| 5,109,543 | A | 4/1992 | Dissosway et al. |
| 5,172,316 | A | 12/1992 | Root et al. |
| 5,172,960 | A | 12/1992 | Chareire |
| 5,188,038 | A | 2/1993 | Shanley |
| 5,222,024 | A | 6/1993 | Orita et al. |
| 5,244,055 | A | 9/1993 | Shimizu |
| 5,249,125 | A | 9/1993 | Root et al. |
| 5,251,856 | A | 10/1993 | Young et al. |
| 5,264,789 | A | 11/1993 | Braun et al. |
| 5,284,097 | A | 2/1994 | Peppin et al. |
| 5,369,587 | A | 11/1994 | Root et al. |
| 5,376,869 | A | 12/1994 | Konrad |
| 5,408,411 | A | 4/1995 | Nakamura et al. |
| 5,412,572 | A | 5/1995 | Root et al. |
| 5,474,267 | A | 12/1995 | Kubota et al. |
| 5,479,156 | A | 12/1995 | Jones |
| 5,590,042 | A | 12/1996 | Allen, Jr. et al. |

FOREIGN PATENT DOCUMENTS

| | | | |
|---|---|---|---|
| DE | 25 28 463 | | 1/1977 |
| DE | 26 28 905 | | 12/1977 |
| DE | 26 33 089 | | 1/1978 |
| DE | 26 35 751 | | 2/1978 |
| DE | 26 40 756 | | 3/1978 |
| DE | 27 41 584 | | 3/1979 |
| DE | 28 48 984 | | 5/1980 |
| DE | 29 25 196 | | 10/1980 |
| DE | 29 21 860 | | 11/1980 |
| DE | 29 43 385 | | 5/1981 |
| DE | 30 26 652 | | 2/1982 |
| DE | 31 12 793 | | 2/1982 |
| DE | 30 40 080 | | 4/1982 |
| DE | 30 47 637 | | 7/1982 |
| DE | 31 26 383 | | 1/1983 |
| DE | 32 08 819 | | 9/1983 |
| DE | 35 40 563 | | 3/1987 |
| DE | 37 02 527 | | 8/1988 |
| EP | 0 030 121 | A1 | 6/1981 |
| EP | 0 102 017 | A2 | 3/1984 |
| EP | 0 102 017 | B1 | 3/1984 |
| EP | 0 132 467 | A1 | 2/1985 |
| EP | 0 326 630 | B1 | 8/1989 |
| EP | 0 326 630 | A1 | 8/1989 |
| EP | 0 499 515 | B1 | 8/1992 |
| EP | 0 499 515 | A1 | 8/1992 |
| FR | 25 42 951 | A1 | 9/1984 |
| GB | 1 179 751 | | 1/1970 |
| GB | 1 353 438 | | 5/1974 |
| GB | 1 406 711 | | 9/1975 |
| GB | 1 430 642 | | 3/1976 |
| GB | 1 430 644 | | 3/1976 |
| GB | 1 430 645 | | 3/1976 |
| GB | 1 485 420 | | 9/1977 |
| GB | 1 501 234 | | 2/1978 |
| GB | 1 501 372 | | 2/1978 |
| GB | 1 526 033 | | 9/1978 |
| GB | 1 543 917 | | 4/1979 |
| GB | 1 543 918 | | 4/1979 |
| GB | 2 024 484 | | 1/1980 |
| GB | 2 035 487 | A | 6/1980 |
| GB | 2 054 229 | | 2/1981 |
| GB | 2 107 910 | A | 5/1983 |
| GB | 2 159 995 | A | 12/1985 |
| GB | 2 167 886 | | 6/1986 |
| GB | 2 186 725 | | 8/1987 |
| GB | 2 188 464 | A | 9/1987 |
| JP | 52-105406 | | 9/1977 |
| JP | 53-064308 | | 6/1978 |
| JP | 3-104769 | | 5/1991 |
| JP | 04-266538 | | 9/1992 |
| JP | 04-364307 | | 12/1992 |
| RU | 669375 | | 11/1976 |
| WO | WO84/03672 | | 9/1984 |
| WO | WO85/01258 | | 3/1985 |

OTHER PUBLICATIONS

Armstrong, John H., "Industrial Car Movers: New Power in an Old Package," *Railway Age,* Mar. 10, 1980, pp. 25–26.

"ATCS Advances—Slowly," *Railway Age,* Feb. 1991, pp. 3.

Azouaoui, Youssef, "Tough Environment Dictates Standards of Electrification," *Railway Gazette International,* Jun. 1980, pp. 501–505.

Biesenbaen, Von Wolfgang and Backer, Kurt, Funkfernsteuerung von Rangierlokomotiven mit tragbarem Sendegerät, pp. 295–302 (no date).

Borchert, Jurgen, (KM–Direct), "A new direction in control, monitoring and diagnosis of traction vehicles," pp. 1–7 (no date).

Canada's Troubled Railroads, Railway Age, Feb. 1991, pp. 3.

Canadian National Contract Proposal by Theimeg USA, Inc., dated Feb. 15, 1991 (87 pages).

Canadian National Contract Proposal dated Feb. 15, 1991, by Theimeg USA, Inc. (3 pages).

Capital Appropriation No. 702–2150 for 1992–93 regarding Locomotive Control System—provide equipment for Beltpack Operation of 4 prototype locomotives (5 pages).

Carlson, Frederick G., & Hawthorne, Keith L., "Train Braking Systems, Now and Into the Future," *Railway Age,* Copyright Simmons–Boardman Publishing Corp. 1992, Jan. 1, 1992, pp. 1–8.

CN Rail's Beltpack Single Man Hump Operation, CN Rail LCS Presentation, Sep. 1992, pp. 1–15.

CN Technical Research Centre, "Flat Yard Switching Project, Minutes of Status Meeting #1 with Transportation—Technological Development," dated Apr. 10, 1989, pp. 1–2.

CN Technological Development (LCS BP Presentation) "Locomotive Control System LCS–Beltpack," (fax dated Oct. 11, 1994) pp. 1–13.

"CN derails engineers," *Kitchener–Waterloo Record,* Jul. 8, 1992, p. B7.

"CN set to replace trains' engineers with remote control," Vancouver Sun, Jul. 8, 1992, p. D2.

"CN Technical Research, Flat Yard Beltpack System (FYBS) Presentation," dated Jan. 15, 1992, pp. 1–2, context diagram, and Figure 4.2.

"CN Yard Workers Use Remote Controls," *US Rail News,* Business Publishers, Inc., vol. 15, No. 15, Jul. 22, 1992.

Command Confirmation Report dated Oct. 30, 1992, with fax cover to J.A. McCann from G. W. Masleck dated Oct. 30, 1992, and with Locomotive Control System for Flat Yard Applications LCS–FYBS Radio Subsystem Specification Highlights (3 pages).

Business card of John T. Bruere (1 page); letter to Canadian National Railway Company from John T. Bruere dated Jan. 25, 1991 (1 page), with a copy of the enclosures (Proposal Flat Yard Beltpack System Canadian National Railways) (44 pages).

"Cut Your Fuel Costs Without Throttling Performance," *Transportation Technology Worldwide,* p. 1, no date.

Davis, Harold, Thin Seam Yields High Output, Coal Age, Jul. 1979, pp. 104–107.

"Earthmovers can operate via radio remote control," *Automotive Engineering,* Society of Automotive Engineers, Inc., vol. 88, No. 4, 1980, pp. 43–44.

Ensink, T., "Radio controlled diesel shunters," 1977 Railway Engineer, vol. 2, No. 1, pp. 30–33.

Escher, Roland, Remote Control and Transmission of Data by Radio, Technische Mitteilungen AEG–Telefunken, vol. 64, No. 4, 1974, pp. 129–131.

Fax Cover (1 page) to ATSE from CN North America dated Oct. 22, 1992, with Locomotive Control System LCS—Beltpack Flat Yard Application CN Rail (11 pages).

Fax cover and letter to Cliff Johnstone from Neal MacNeal dated Oct. 9, 1992 (5 pages), with Technical Description for Offer OL 82 160 738–2, and drawing (7 pages).

Fax cover and letter to Glen W. Masleck from John G. Risch dated Nov. 23, 1992 (9 pages), additional letter to Glenn Masleck from John Risch dated Nov. 23, 1992 (11 pages).

Fax cover and letter to Glenn L. Masleck from Robert R. O'Farrell dated Dec. 11, 1992, with locomotive control system for flatyard applications pilot production program 1993 spreadsheet (3 pages).

Fax cover sheet from F. Horst to G. C. Hutt dated Jul. 6, 1990 with attachments: (1) letter from F. Horst to G. C. Hutt dated Jul. 5, 1990 regarding Flat Yard Beltpack Demonstration Unit Loco #7530—1 page; (2) letter from R. Schreyer to W. N. Caldwell dated Jul. 5, 1990 regarding Modifications—1 page; and (3) Quotation from Vectran Corporation to Canadian National Railways dated Jul. 5, 1990, including Vectran Specification #900235 Modifications to CNR Equipments—4 pages.

Fax Cover to Canadian National Railways from Richard C. Seeman dated Dec. 18, 1991, with invoice No. 12320 and requisition item (3 pages).

Fax cover to G.C. Hutt from John Risch dated Jun. 3, 1991, regarding proposed modification of quotation L–0012–02.14 (1 page).

Fax cover to Glen W. Masleck from Jeffrey A. McCann dated Dec. 7, 1992, with quotation No. 920384–4, and fax to G. Patterson from Doug Arsinean dated Dec. 8, 1992 (5 pages).

Fax Cover to Glen W. Masleck from Jeffrey A. McCann dated Dec. 7, 1992, with revised quotation No. 920384–3 (4 pages).

Fax Cover to Glen W. Masleck from John G. Risch dated Nov. 23, 1992 (1 page) with letter to Doug Arsineau from John G. Risch dated Nov. 23, 1992 (1 page), and letter to Glenn W. Masleck from John Risch dated Nov. 23, 1992 (9 pages).

Fax cover to Glenn W. Masleck from Jeffrey A. McCann dated Nov. 19, 1992, and Confidentiality Undertaking (2 pages).

Fax cover to H. Plum from N. MacNeal dated May 31, 1991, and letter to G.C. Hutt from John Risch dated Jun. 4, 1991 (2 pages).

Fax cover to J. Risch from D.A. Arsineau dated Nov. 19, 1992, with copy of Locomotive Control System for Flat Yard Applications LCS–FYBS Radio Subsystem Specification Highlights (4 pages).

Fax cover to J.A. McCann from D. A. Arsineau dated Nov. 19, 1992 (1 page), with Locomotive Control System for Flat Yard Applications LCS–FYBS Radio Subsystem Specification Highlights and Confidentiality Undertaking forms (4 pages).

"FCC Grants Petition On Tone Modulation," *Railway System Controls,* Jul. 1972, pp. 11–12.

Fischer, K., "Radio–Telephone for Railroads and Local Traffic," Glasers Ann, vol. 94, Nr. 12, Dec. 1970, pp. 387–393.

"Flat Yard Beltpack System—External Design Report," CANAC International Inc., dated Jan. 22, 1993, pp. 1–4 (errata sheets); pp. 1–4; 1–1–1–2; 2–1; 3–1–3–4;4–1–4–30; 5–1–5–2; 6–1–6–12; 7–1–7–4; 8–1–8–3; A1–1–A1–10; A2–1–A2–2.

Frank, W., "Automatic Radio Control for Train Running," *Signal und Draht,* vol. 69, No. 4, Apr. 1977, pp. 69–76.

Gabriel, Jiri, "Využití bezdrátového přeoosu k dálkovému fizení posunovacích lokomotiv," Elektrotechn. obzor 69, (1980), pp. 452–454.

Gillen, Paul and Schonenberger, Albert, "Krauss–Maffei Maximum Power Control System," 2 pages (no date).

Go, G.B., "A Modular–Built Warning System to Warn Track Maintenance Gangs of Approaching Trains," *Signal und Draht,* vol. 69, Nr. 1/2, 1977, pp. 29–31.

Grolms, R. and Schmidt, M., Radio Remote Control of the Hump Locomotives at the Munich (North) Marshalling Yard, Signal und Draht, vol. 82, No. 12, 1990, pp. 231–235.

Grolms, Reinhard and Mickler, Gunther "Ablaufsteuerung in 32–bit–Technik fur den Rangier–bahnof Munchen Nord," *Signal Draht,* 1989, pp. 206–214.

Grolms, Reinhard and Mickler, Günther, "Humping Control System Using 32–bit Technology for the Munich–North Marshalling Yard," *Signal und Draht,* 1989, pp. 206–214.

Grolms, Reinhard and Schmidt, Manfred, "Die Funkfernsteuerung der Abdrucklokomotiven im Rbf Munchen Nord," 1990, pp. 231–235 (including translation—"System of radio control of shunting locomotives (switch engines) in the marshalling yard of Munchen Nord").

Gunther, J., et al., "Fu BR 80 Type–a novel radio–remote control facility for brake test plants," *Signal und Draht,* vol. 75, No. 11, pp. 202–209 (no date).
Hand–written note (1 page), order recommendation to R.G. Butler, dated Dec. 10, 1992, file/bid No. 26 controls loco remote 90–1 (2 pages), and quotation No. 920384–4 (3 pages).
"How CONTRAIL kept the mail moving (during nationwide strike)," *Railway Age,* Aug. 1, 1992, pp. 1–9.
Huybrechts, J.C.R., "Telecommunications and Remote Control in Underground Workings," (German/French document), Annales des Mines de Belgique, Jun. 1980, pp. 637–651.
Implementation Officers Play Key Role (*Association Of American Railroads Vehicle Track Systems Newsletter*), *Railway Age,* Copyright Simmons–Boardman Publishing Corp. 1990, Jun. 1, 1990, pp. 1–4.
Japanese Document, Maruzen IEEE, ISBN4–621–03400–6 C3554, 1989, p. 596.
"KCS Extends Remote Controlled Locomotive Operation And CTC," *Railway System Controls,* Dec. 1972, pp. 28–29.
Koerbs, Thorald, "Radio Remote Control for VPS Shunting Operations," Zeitschrift fuer Eisenbahnwesen und Verkehrstechnik—Glasara Annalen, vol. 109, Nr. 2–3, Feb.–Mar. 1985, pp. 142–148.
Krauss Maffei Verkehrstechnik, "K–Micro Anti–wheelslip and anti–wheelskid device," *Product Line Vehicle Electronics,* Aug. 27, 1991, pp. 1–21.
Letter (in German) dated Aug. 14, 1991, to Theimeg USA from Ingrid Lange regarding travel plan and tickets for CN personnel (translation included) (7 pages).
Letter dated Apr. 21, 1992, to J.W. Armstrong from D.H. Grant regarding flat yard testing (2 pages).
Letter dated Jul. 7, 1989, to Cliff Johnstone from Friedrick Goy regarding THEIMEG Remote Control and Data Transmission systems for railroads (2 pages).
LCS BP Presentation, "Locomotive Control System Symington Yard," Sep. 1991 (pp. 1–15).
Letter dated Sep. 18, 1991, to Mr. G.C. Hutt from John G. Risch regarding translation from Deutsche Bundesbahn (2 pages).
Letter dated Sep. 9, 1991, to Theimeg Electronikgerate from John Risch regarding Canadian National—Feedback from Cliff Johnstone (1 page).
Letter from N. Caldwell to G. C. Hutt dated Oct. 10, 1990 with attached "External Design Report for CN7530 Demonstration Upgrade," CN Technical Research Center, dated Oct. 1990 (Title page, contents page, pp. 1–10).
Letter to D.G. Parsons from Hans–Georg Reiss dated Nov. 5, 1987 (2 pages) with quotation No. 60.202/01.87 dated Nov. 5, 1987 (4 pages), Request for Quotation dated Oct. 13, 1987 (1 page), and letter to Friedrich Goy from D.H. Grant dated Sep. 16, 1987 (1 page).
Letter to Dr. Nelson Caldwell from Robert R. O'Farrell dated Dec. 10, 1992, regarding receiver/decoder configuration and operation, with Proposed Configuration of Vectran Receiver/Decoder for CN Flatyard Applications and current Vectran receiver decoder scheme (3 pages).
Letter to G.C. Hutt from John Risch dated Jul. 2, 1991, regarding reduction to price of prototype systems (2 pages).
Letter to Glen W. Masleck and Doug Arsineau from Jeffrey A. McCann dated Dec. 4, 1992 (1 page), with Vectran quotation No. 920384–2 (3 pages).
Letter to Glenn Masleck from Robert R. O'Farrell dated Feb. 13, 1991 (1 page), with Vectran Proposal 910140 (32 pages).
Letter to Glenn W. Masleck from Jeffrey A. McCann dated Nov. 4, 1992 (1 page), with quotation No. 920384 (5 pages).
Letter to H.C. Henry from G. Patterson dated Dec. 18, 1992 (1 page), letter to R.M. Schmidt from G. Patterson dated Apr. 1, 1993 (2 pages), with a copy of the enclosures (Proposal to ATSF Railway Co. for Application of a Beltpack Locomotive Control System at Argentine Yard—Mar. 1993 proposed 904A) (16 pages), Canac International Inc. Railroad Technologies Division Humping Procedures (2 pages)and LCS ATSF Argentine Yard Mar. 1993 (1 page) and System Price (1 page).
Letter to J.C. Johnstone from John G. Risch dated Sep. 19, 1991 (2 pages).
Letter to J.G. Risch from G. Patterson dated Feb. 12, 1993 (1 page); letter to J.A. McCann from G. Patterson dated Feb. 12, 1993 (1 page); and fax cover sheet to John Risch from R.G. Butler dated Jan. 8, 1993 (1 page).
Letter to J.G. Risch from G. Patterson dated Mar. 30, 1993 (1 page); memo to file EM–6085–2–905 dated Mar. 30, 1992 (1 page); and Project: Flatyard Beltpack System (FYBS) Project #6905 File: EM–6085–2–905—Draft Radio Subsystem Specification dated Mar. 30, 1993 (46 pages).
Linde, Helmut et al., "Ferngesteuerte Thyristor–Grubenlokomotiven für den Erzbergbau," Techn. Mitt AEG–TELEFUNKEN 60 (1970) 4, pp. 239–246.
Linker, W., and Schliebus, K., "Locally–Operated Electric Switch. Mode of Operation and Possible Uses," *Signal und Draht,* vol. 72, No. 1–2, Jan.–Feb. 1980, pp. 35–38.
Literature, Railway Age, Mar. 1991, pp. 3.
"Locomotive Control System Flat Yard Beltpack Systems," CN FYBS Project Status Meeting No. 2 (10 pages), (no date).
"Macro Benefits From Microprocessors," *Railway Age,* Mar. 1989, pp. 38–40.
Massie, Herbert L., "Channel Utilization by Remote Locomotive Control Systems Using Digital Transmission," Atchison, Topeka & Santa Fe Railway Company, pp. 134–137 (no date).
McElhenny, S.W. and Ryan, P.T., "Trends in rail transportation," Institute of Electrical and Electronics Engineers, 1968, p. 39.
McQueen, W.M. & Co., Pty Ltd., "Deep Seam–Face Automation Stage 3—Continuous Haulage and Miner Remote Control," Commonwealth of Australia, National Energy Research, Development & Demonstration Program, End of Grant Report No. 752, May 1988, pp. 284.
Meier, Felix and Krähenbühl, Von Peter, "Rationalisierung durch Lok–Fernsteuerung," *Funkanlagen,* Apr. 1981, pp. 360–364.
Memo dated Aug. 13, 1991, to H. Plum from H. Rische regarding CN topics of discussion (1 page).
Memo dated Sep. 2, 1991, to GF from T (signed by Hans–Jurgen Wunderer) regarding description of the actual Vectran–CN–System for meeting on Aug. 30, 1991 with Mr. Horst (4 pages).
Memo from Fred Horst dated Mar. 30, 1992 (1 page) with Project: Flatyard Beltpack System (FYBS) Project #6905 File: EM–6085–2–905—Draft Radio Subsystem Specification dated Mar. 30, 1993 (46 pages).
Memorandum to H. Plum from H. Risch dated Feb. 10, 1992, Cliff Johnstone (1 page).

Miller, Luther S., ATCS Advances in Canada, *Railway Age,* Mar. 1989, pp. 41–43.
Nagase, Kazuhiko, "Automation on Locomotive Shunting Operations at Musashino Marshalling Yard," *Japanese Railway Engineering,* vol. 17, No. 1, 1977, pp. 19–21.
New Concepts In Today's Track Mines, *E/MJ Mining Guidebook,* Jun. 1970, pp. 164–167.
Order recommendation to R.G. Butler dated Dec. 16, 1992, file/bid No. 26 controls loco remote 90–1 (2 pages).
Pacesetter II, "Instruction Manual," Vapor Corporation Sales Meeting 1973, 22 pages.
Pankrat'ev, O.N. "Operating Experience with the Electrical Dave for a Coke–Car Locomotive in a Remote Control System," *Koksi Khimiya,* 1975, No. 8., pp. 33–37.
Parker, C.W., "Design and Operation of Remote–Controlled Locomotives in Freight Trains," Jan. 1974, pp. 29–38.
"Products Report," *Railway Age,* Aug. 1989, pp. 73–74.
Program (in German) dated Oct. 5, 1989, for visit of Cliff Johnstone (translation included) (6 pages).
Purchase Order No. 00–6677 dated Dec. 22, 1992, with letter to Jeffrey A. McCann dated Dec. 21, 1992, with Command Confirmation Report (3 pages).
"Quantum–Vmv Trainmaster™ Locomotive Control System," Paducahbilt, retrieved from http://www.paducahbilt-.com/Pages/trainmaster_new.htm, Feb. 27, 2002, pp. 1–4.
Quotation No. 60.303/07.89 (2 pages), Jul. 1989.
Quotation No. 920384–1 dated Nov. 4, 1992, to Glenn W. Masleck (5 pages).
Radio Controlled Mine Locomotive, Measurement and Control, vol. 9, Jul. 1975, p. 256.
"Radio controlled units help steel company," *Railway System Controls,* Dec. 1970, pp. 19–21.
"Radio remote control locomotives," National Safety Council, 1985, pp. 1–4.
"Radio–Controlled Locomotives," BBC Summary of World Broadcasts, Copyright 1986 The British Broadcasting Corporation, Jul. 12, 1986, p. 1.
"Radio–Remote–Control Locomotives," National Safety Council, 1991, pp. 1–4.
"Rail Update," *Railway Age,* Sep. 1992, pp. 2.
"Reliability evaluation of a brake pipe flow indicator for use with remote control locomotive equipment," Association of American Railroads Research and Test Department, Mar. 1971, pp. 63344.1–63344.11.
"Remote Control Of Slave Locomotives," *The Railway Gazette,* Sep. 6, 1968, pp. 672–673.
"Remote control replaces engineers in rail yards," *Edmonton Journal,* Jul. 1992, 6 pages.
"Remote control replaces engineers in rail yards," *Edmonton Journal,* Jul. 8, 1992, p. D12.
Republic of South Africa Application for a Patent and Acknowledgement of Receipt entitled "Data Transmission Systems," dated Jul. 2, 1982, Hans–Arnim Lange, Patent Application No. 824733, pp. 14.
Request for Proposal (1 page) (no date).
Request for Proposal (3 pages) (no date).
Richter, R., "Radio–Remote Control of Locomotive on Factory Sites," *Journal Berg–Huettenmaenn. Monatsh,* Jan. 1980, 125 (1), pp. 29–36.
Rieger, Franz, "Operation with Diesel Locomotives on the German Federal Railways," *Eisennahningenteur,* vol. 36, No. 12, Dec. 1985, pp. 561–566.
Rockwell International, "If You Knew What Rockwell ATCS Could Do For Your Bottom Line, We'd Already Be Talking," *Railway Age,* Jun. 1989, pp. 4.
Sapahob, et al., "Chetema Teaeyopabaehhr Aokomothbom 'TA–76,'" *Astomstinka,* pp. 14–17, no date.
Schematic Wiring Diagram, Mar. 7, 1990 (30 pages).
Schiefar, Werner and Stubler, Heinz, "Use of remote–controlled locomotives in an iron and steel works," *Stahl u. Eisen 95* (1975) Nr. 20, pp. 931–936.
Schmidt, M. and Schurmans, P., "Radio Remote–Controlled Humping Locos–Signalling Elements," *Signal und Drahl,* vol. 80, No. 9, Sep. 1988, pp. 205–207.
Schmidt, Manfred, "Funkferngesteuerte Abdrüklokomotiven," *Eisenbahningenieur 1981,* pp. 527–535.
Schönenberger, Albert "Speed Control for Shunters," Manager Vehicle Electronics, 3 pages (no date).
"SMET Automatic Control System For Multiple Trains," BBC Summary of World Broadcasts, Copyright 1986, The British Broadcasting Corporation, Sep. 12, 1986, pp. 3.
Stephens, Bill, "Running Trains by Remote Control," *Trains,* Mar. 1994, pp. 45–49.
Streit, Von Manfred "Funk–Fernsteuerung von Rangierlokomotiven," Apr. 1977 (3 pages).
Summary of information to gather during visit to Theimeg (2 pages) (no date).
"Switching CN cars off–board job," *Vancouver Province,* Jul. 9, 1992, p. B14.
Tatematau, Osamu et al., "Radio Control System of Diesel Hydraulic Locomotive," UDC 625 282–519, 1970, pp. 671–675.
Telefax to Cliff Johnstone from John G. Risch dated Apr. 26, 1991, and memo to Cliff Johnstone from John Risch dated May 30, 1991 (2 pages).
Thomas, Karl, "Funkfernsteuerung von Dieselrangierlokomotiven bei der Deutschen Bundesbahn," ISSN 0342–8753, 1981–82, pp. 26–34.
"Thoroughbred Quality: Off and Running," *Railway Age,* Aug. 1992, pp. 19 and 46.
Tougyuam, Lia, et al., "Application of Locomotive Radio Remote Control Technique to Heavy Haul Combined Train in Mountainous Region," pp. 102–109 (no date).
"Trains moved by remote control," *Montreal Gazette,* Jul. 8, 1992, p. D1.
Tukaoka, Tudush, et al., Automatic Train Operation Equipment Remote Control Type for the Shunting Locomotive in Ironworks, 1974, pp. 49–54.
U.S. Appl. No. 10/374,589 (5,685,507), filed Feb. 26, 2003, entitled "Remote Control System For A Locomotive," by Folkert Horst et al.
Ullrich, Gerhard, "Fernsteuerung von Industrielokomotiven am Entladebunker des Kraftwerkes Scholven der Hibernia AG," Techn. Mitt AEG–TELEFUNKEN 60 (1970) 4, pp. 246–250.
"Update: Woodward's Complete Locomotive Control," *Railway Age,* Jul. 1990, pp. 3.
Vandervort, Thomas L., "PCM used for remote controls," *Railway System Controls,* Aug. 1971, pp. 20–25.
Vantuono, William C., "LIRR: Customer–Focused," (Long Island Railroad; Includes A Related Article on The Railroad's Freight Business), *Railway Age,* Copyright Simmons–Boardman Publishing Company 1992, Oct. 1, 1992, pp. 1–7.

Vectran Corp. (Relocates), *Railway Age,* Copyright Simmons–Boardman Publishing Company 1994, Mar. 1, 1994, p. 1.

Verlagsbuchhandlung, Georg Siemens, "Present state of development of radio–controlled locomotive operation," ZEV–Glas. Aon. 107 (1983) Nr. 11, pp. 380–385.

Welty, Gus, "ATCS: More Than 'Train Control,'" *Railway Age,* Aug. 1988, pp. 45–49.

Welty, Gus, "Putting The Pieces Together," (High–Tech Railroading), *Railway Age,* Copyright Simmons–Boardman Publishing Corp. 1990, Sep. 1, 1990, pp. 2–6.

"What's Holding Up ATCS?" *Railway Age,* Apr. 1990, pp. 39–41.

Wilson, Mark, "CN to Axe 10,000 Workers Over 3 Years," 2002 Southam Inc., Vancouver Province, Dec. 11, 1992, pp. 2.

Wolf, K.H., "Efficient Shunting With Consideration of the Physical Stress on the Crew," *Stahl und Eisen,* vol. 97, Nr. 17, 1977, pp. 810–814.

Yukatsu Sijutso (Hydraulic & Pneumatics), Special Issue: "Radio Control of Industrial Equipment." *Radio Control of Equipment at Steel Works,* 1993, vol. 32, No. 12, pp. 43–47.

Zaets, S.D. & Shul'Ga, A.M., "Braking System for Remotely and Automatically Controlled Electric Locomotives," *Koksi Khimiya,* No. 3, pp. 43–44 (no date).

Zirouhov, EI and Levin, IG, "Remote Control of Locomotives Hauling Heavy Trains," *Zheleznodorozhnyi Transport,* No. 6, 1977, pp. 49–53.

Zolle, Gunther, "Heutiger Stand der Funkfernsteuerung von Industrielokomotiven in einem Huttenwerk," *Stahl u. Eisen* 102 (1982) Nr. 24, pp. 1237–1238.

Zölle, Von Gunther, "Funkfernsteuerung von Industsrielokomotiven in der Bundesrepublik Deutschland," *Zeitschrift fuer Eisenbahnwesen und Verkahrstechnik,* 109 (2–3), 1985, pp. 122–130.

* cited by examiner

REMOTE CONTROL SYSTEM FOR A LOCOMOTIVE

Matter enclosed in heavy brackets [ ] appears in the original patent but forms no part of this reissue specification; matter printed in italics indicates the additions made by reissue.

*More than one reissue application has been filed for U.S. Pat. No. 5,511,749. The present reissue application is a continuation of application Ser. No. 10/374,590, Reissue No. RE39,011, filed Feb. 26, 2003, which is a reissue application of U.S. Pat. No. 5,511,749.*

FIELD OF THE INVENTION

The present invention relates to an electronic system for remotely controlling a locomotive. The system is particularly suitable for use in switching yard assignments.

BACKGROUND OF THE INVENTION

Economic constraints have led railway companies to develop portable units allowing a ground based operator to remotely control a locomotive in a switching yard. The unit is essentially a transmitter communicating with a slave controller on the locomotive by way of a radio link. Typically, the operator carries this unit and can perform duties such as coupling and uncoupling cars while remaining in control of the locomotive movement at all times. This allows for placing the point of control at the point of movement thereby potentially enhancing safety, accuracy and efficiency.

Remote locomotive controllers currently used in the industry are relatively simple devices that enable the operator to manually regulate the throttle and brake in order to accelerate, decelerate and/or maintain a desired speed. The operator is required to judge the speed of the locomotive and modulate the throttle and/or brake levers to control the movement of the locomotive. Therefore, the operator must posses a good understanding of the track dynamics, the braking characteristics of the train, etc. in order to remotely operate the locomotive in a safe manner.

OBJECT AND STATEMENT OF THE INVENTION

An object of the invention is to provide a remote control system allowing the operator to command a desired speed and responding by appropriately controlling the throttle or brake to achieve and maintain that speed.

Another object of the invention is to provide a remote locomotive control system allowing for control of the locomotive from one of two different transmitters.

Yet another object of the invention is to provide a remote locomotive control system having the ability to perform a number of safety verifications in order to automatically default the locomotive to a safe state should a malfunction be detected.

SUMMARY OF THE INVENTION

As embodied and broadly described herein the invention provides a locomotive remote control system. The system has

- a transmitter capable of generating a binary coded radio frequency signal representing commands to be executed by the locomotive and
- a slave controller for mounting on-board the locomotive. The slave controller has a) a receiver for sensing the radio frequency signal;
  b) a processor for receiving the radio frequency signal; and
  c) a velocity sensor for generating data representing velocity of the locomotive. The processor responds to the velocity sensor and to the RF signal to actuate either one of a brake of a locomotive or a tractive power of the locomotive in order to attempt maintaining a requested speed.

As embodied and broadly described herein the invention also provides a locomotive control system which has a) a transmitter for generating a binary code RF signal; and
  b) a slave controller mounted on-board the locomotive for receiving that signal, the slave controller selectively accepting commands from a first transmitter or from a second transmitter.

As embodied and broadly described herein the invention further provides a remote control system for a locomotive which has a) a transmitter for generating an RF binary coded signal; and
  b) a slave controller mounted on-board the locomotive. The slave controller includes
    - a first sensor responsive to pressure of compressed air in a main tank of the locomotive; and
    - a second sensor responsive to flow of compressed air in responds to output of the sensors to enable application of tractive power to the locomotive only when a pressure in the main tank is above a predetermined level and a flow of air in the brake line is below a predetermined level.

DESCRIPTION OF PREFERRED EMBODIMENTS

Figure 1:
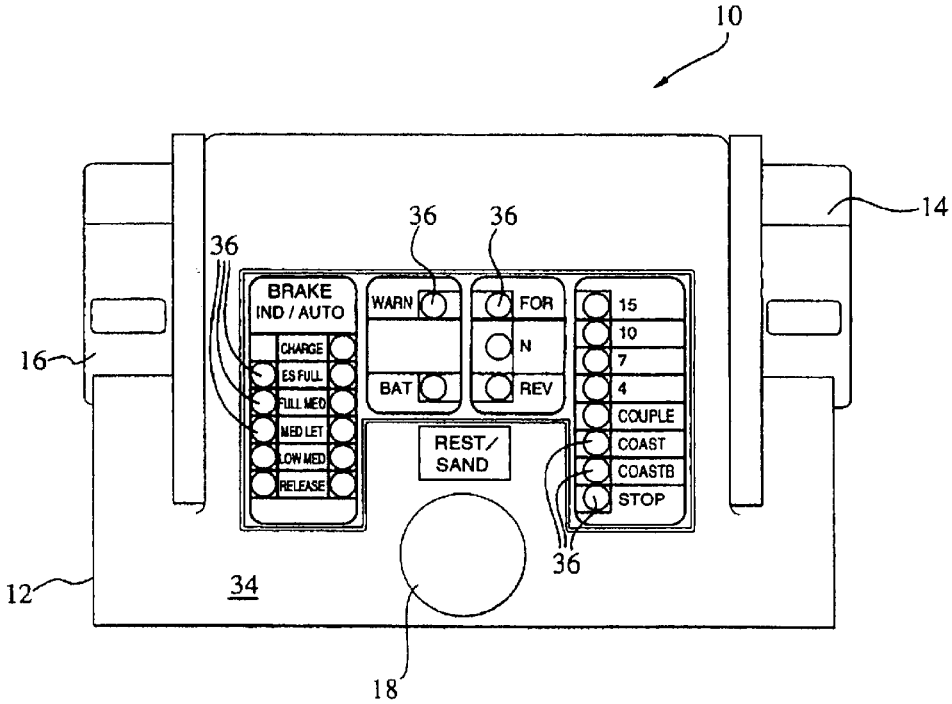
FIG. 1 is a top plan view of the portable transmitter of the remote locomotive control system in accordance with the invention.
Figure 4:
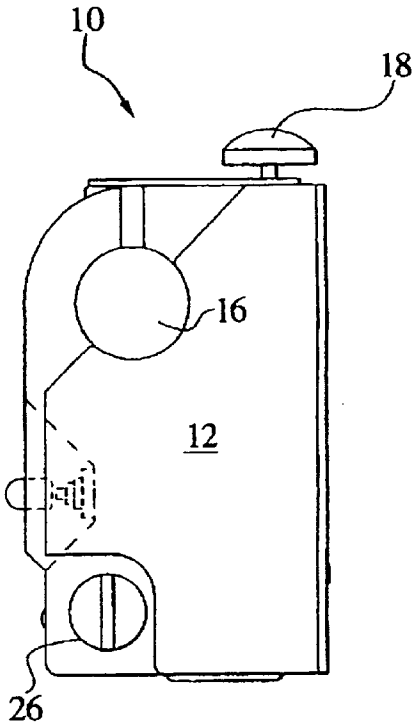
FIGS. 2 and 4 are side elevational views of the portable transmitter.
Figure 3:
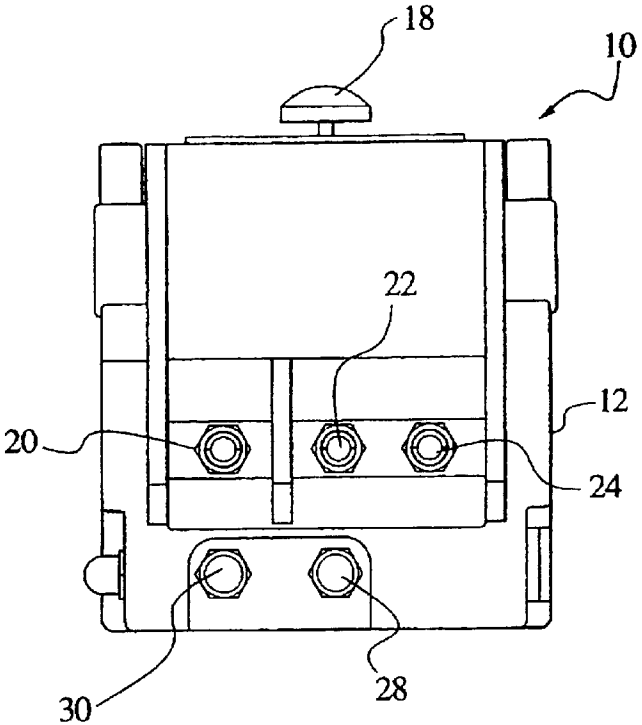
FIG. 3 is a front elevational view of the portable transmitter.
Figure 2:
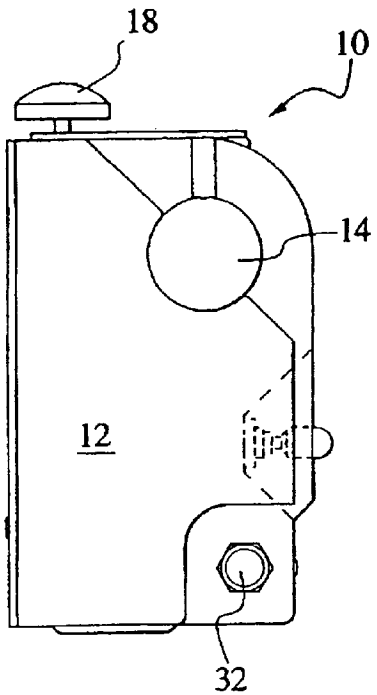

With reference to the annexed drawings, the locomotive control system in accordance with the invention includes a portable transmitter 10 which generates a digitally encoded radio frequency (RF) signal to convey commands to a slave controller mounted on-board the locomotive. The slave controller decodes the transmission and operates various actuators on the locomotive to carry into effect the commands remotely issued by the operator.

FIGS. 1 to 4 illustrates the physical layout of the portable transmitter 10. The unit comprises a housing 12 enclosing the electronic circuitry and a battery supplying electric power to operate the system. A plurality of manually operable levers and switches projecting outside the housing 12 are provided to dial-in locomotive speed, brake and horn settings, among others. The various controls on the portable transmitter are defined in the following table:

| REFERENCE NUMERAL | FUNCTION | TYPE OF ACTUATOR |
|---|---|---|
| 14 | Locomotive Speed Control | Multi-Position Lever |
| 16 | Locomotive Over-ride Brake Control | Multi-Position Lever |
| 18 | Reset | Push-Button |
| 20 | Direction (Forward/Reverse/ Neutral) | Multi-Position Switch |
| 22 | Ring Bell/Horn | Toggle Switch |
| 24 | Train Brake Control | Toggle Switch |
| 26 | Power on/Lights Dim/Bright | Multi-Position Switch |
| 28 | Status Request | Push-Button |
| 30 | Time Extend | Push-Button |
| 32 | Relinquish Control to Companion Portable Transmitter | Push-Button |

A detailed description of the various functions summarized in the above table is provided later in this specification.

On the top surface of the housing 12 is provided a display panel 34 that virtually echoes the control settings of the portable transmitter 10. The display panel 34 includes an array of individual light sources 36, such as light emitting diodes (LED), corresponding to the various operative conditions of the locomotive that can be selected by the operator. Hence, a simple visual observation of the active LED's 36 allows the operator to determine the current position of the controls.

Figure 5:
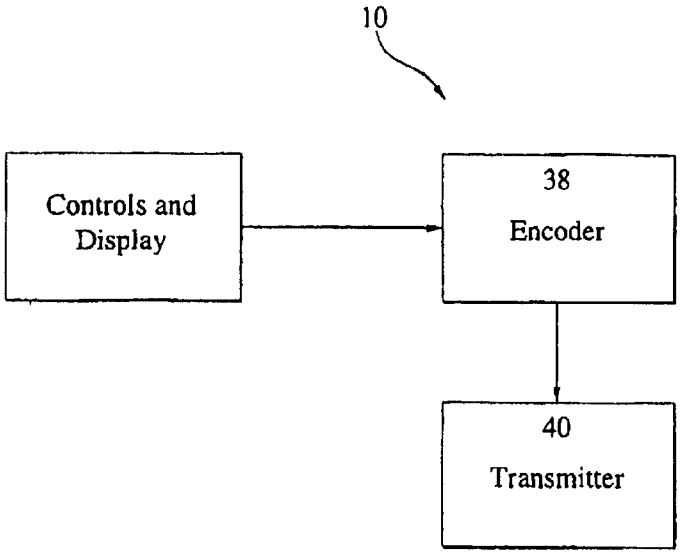
FIG. 5 is a functional block diagram of the portable transmitter.

FIG. 5 provides a functional diagram of the portable transmitter 10. The various manually operable switches and levers briefly described above are constituted by electric contacts whose state of conduction is altered when the control settings are changed. For instance, the push-buttons 18, 28, 30 and 32, and the toggle switches 22 and 24 have electric contacts that can assume either a closed condition or an opened condition. The multi-position levers 14 and 16, and the multi-position switches 20 and 26, have a set of electric contact pairs, only a single pair being closed at each position of the lever or switch. By reading the conduction state of the individual electric contact pairs, the commands issued by the operator can be determined.

An encoder 38 scans at short intervals the state of conduction of each pair of contacts. The scan results allow the encoder to assemble a binary locomotive status word that represent the requested operative state of the locomotive being controlled. The following table provides the number of bits in the locomotive status word required for each function:

| NUMBER OF BITS IN LOCOMOTIVE STATUS WORD | FUNCTION |
|---|---|
| 3 | Locomotive Speed Control |
| 3 | Locomotive Brake Control |
| 1 | Reset |
| 2 | Direction (Forward/Reverse/ Neutral) |
| 2 | Ring Bell/Horn |
| 3 | Train Brake Control |
| 1 | Lights Dim/Bright |
| 1 | Status Request |
| 1 | Time Extend |
| 1 | Relinquish Control to Companion Portable Transmitter |

The locomotive status word also contains an identifier segment that uniquely represents the transmitter designated to control the locomotive. The purpose of this feature is to ensure that the locomotive will only accept the commands issued by the transmitter generating the proper identifier.

Most preferably, the encoder 38 includes a microprocessor programmed to intelligently assemble the locomotive status word. The microprocessor continuously scans the electric contacts of the transmitter controls and records their state of conduction. On the basis of the identity of the closed contacts, the program will produce the function component of the locomotive status word which is the string of bits that uniquely represents the functions to be performed by the locomotive. The program then appends to the function component the locomotive identifier component and preferably a data security code enabling the receiver on-board the locomotive to check for transmission errors.

In a different form of construction, the encoder may be constituted by an array of hardwired logic gates that generate the locomotive status word upon actuation of the controls.

Figure 6:
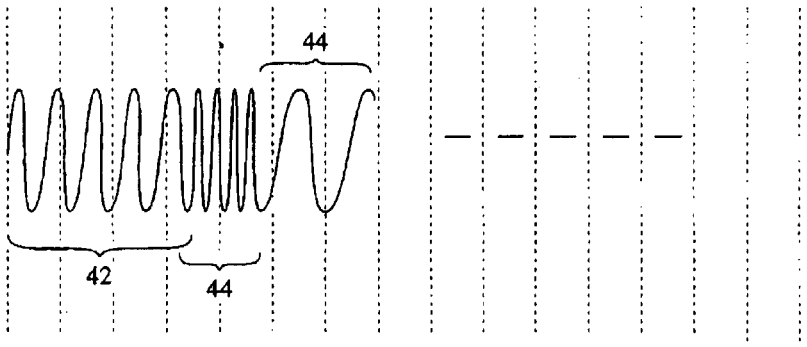
FIG. 6 is a diagram of the signal transmission protocol between the portable transmitter and a slave controller mounted on-board the locomotive.

A transmitter 40 receives the locomotive status word and generates an RF signal for transmission of the coded sequence by frequency shift keying. In essence, the frequency of a carrier is shifted to a first value to signal a logical 1 and to a second value to signal a logical 0. The transmission protocol is best shown in FIG. 6. Each transmission begins with a burst of the carrier frequency 42 for a duration of eight (8) bits (the actual time frame is established on the basis of the transmission baud rate allowed by the equipment). Each bit of the data stream is then sent by shifting the frequency to the first or the second value depending on the value of the bit, during a predetermined time slot 44.

The transmitter 40 sends out the locomotive status word in repetition at a fixed rate selected in the range from two (2) to five (5) times per second. By providing the transmitter with a unique repetition rate, the likelihood of transmission errors is reduced when several portable transmitters in close proximity broadcast control signals to individual locomotives, as described below.

Figure 7:
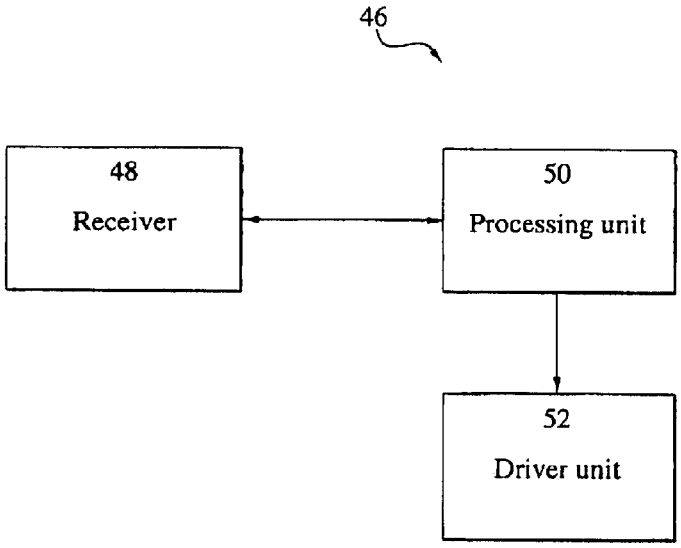
FIG. 7 is a functional block diagram of the slave controller mounted on-board the locomotive.

FIG. 7 provides a diagrammatic representation of the slave controller mounted on board the locomotive. The slave controller identified comprehensively by the reference numeral 46 has three main components, namely a receiver unit 48, a processing unit 50 and a driver unit 52. More particularly, the receiver unit 48 senses the locomotive status word sent out from the portable transmitter 10, decodes the transmission and supplies the resulting binary sequence to the processing unit 50. To achieve a reliable communication link, the receiver 48 is synchronized with the transmitter 40 at three different levels. First, the receiver circuitry defines a signal acceptance window that opens itself at the rate at which the locomotive status word is sent out by the respective controlling transmitter 40. Second, the receiver 48 will observe the frequency value of the transmission in order to decode the binary sequence at intervals precisely corresponding to the time slots 44. Third, the acceptance window opens in phase with the signal transmission.

Figure 8:
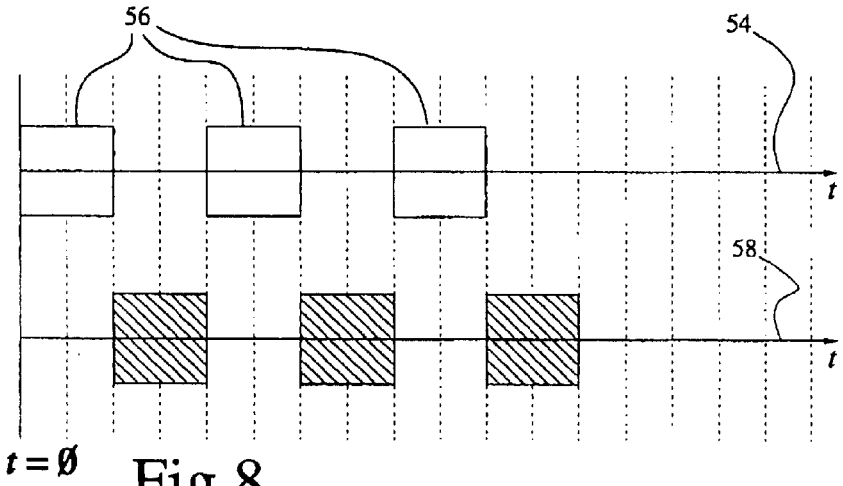
FIG. 8 is a diagram illustrating the temporal relationship between signal transmission and the operation of the receiver of the slave controller.

The first two levels of synchronization are established through hardware designs, by setting the transmitter 40 and the receiver 48 to the same period of transmission/reception. On the other hand, the phasing of the receiver to the incoming locomotive status word transmission is effected through observation of the burst of carrier frequency 42 that begins each transmission cycle. The diagram in FIG. 8 graphically illustrates the relationship between the signal transmission and the signal reception. The time line 54 shows the successive transmission of the locomotive status word as a series of blocks 56. The activity of the receiver 48 is shown on the time line 58. The hatched areas correspond to the time intervals during which the receiver is not listening. At time t=0 the first locomotive status word is sent out by the transmitter 40. The burst of the carrier frequency 42 is sensed by the receiver 48 which then activates the sequence of opening and closing of the signal acceptance window which is fully synchronized (in period and phase) with the signal transmission.

Figure 9:
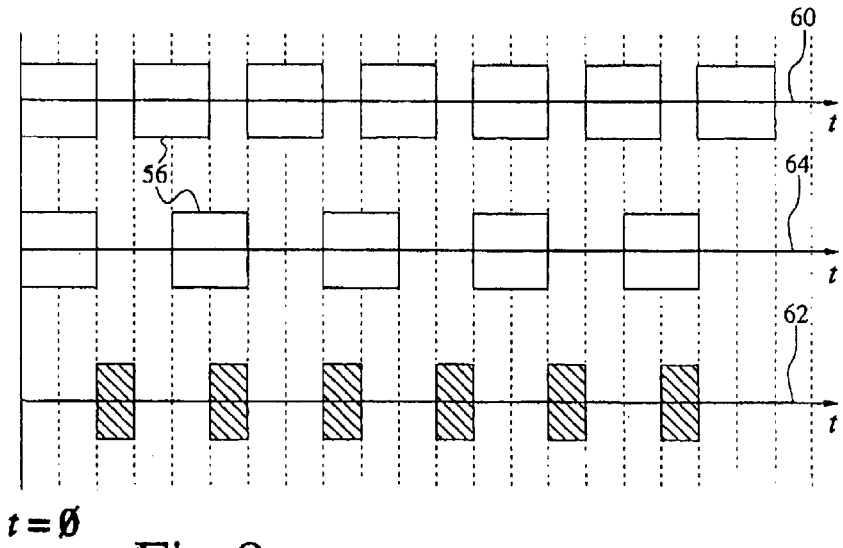
FIG. 9 is a diagram illustrating the temporal relationship between signal transmission from two portable transmitters and the operation of the receiver of the slave controller.

This characteristic is particularly advantageous when several transmitters broadcast simultaneously control signals to different locomotives in close proximity to one another. By setting each transmitter (and the companion receiver) at a unique transmission/reception period, secure communication links can be maintained even when all the transmitters use the same carrier frequency. FIG. 9 illustrates this feature. Time line 60 shows the transmission pattern of a first portable transmitter. The time line 62 depicts the window of acceptance of the companion receiver. The numeral 64 identifies the transmission pattern of a second portable transmitter. Assuming that both portable transmitters are actuated exactly at t=0, the signal received during the first opening of the window of acceptance will be corrupted since two locomotive status word transmissions are concurrent in time. However, the third and the seventh locomotive status word transmissions from the first portable transmitter will be clearly received since there is no overlap with the locomotive status words sent out by the second portable transmitter. Hence the purpose of providing each transmitter with a unique signal repetition rate reduces the likelihood of transmission conflicts.

It should be noted that the receiver 48 can, and probably will, correctly receive from time to time a locomotive status word from an unrelated transmitter. This status word will be rejected, however, because the transmitter identifier will not match the value stored in the memory of the slave controller.

The transmitter/receiver gear of the remote locomotive control system has been described above in terms of function of the principal parts of the system and their interaction. The components and interconnections of the electric network necessary to carry into effect the desired functions are not being specified because such details are well within the reach of a man skilled in the art.

Figure 10:
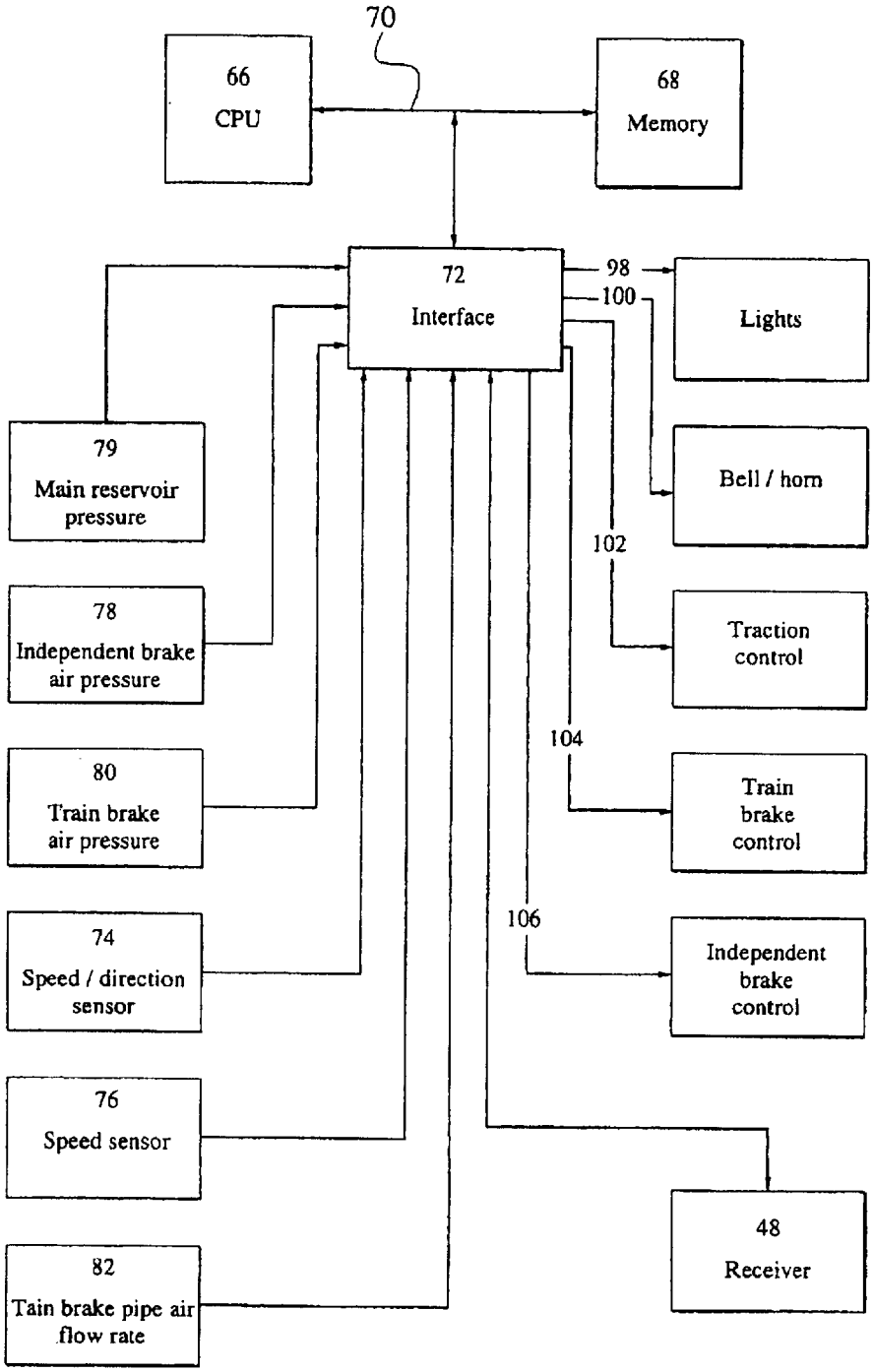
FIG. 10 is a detailed functional block diagram of the slave controller mounted on-board the locomotive.

FIG. 10 provides a functional diagram of the processing unit 50. A central processing unit (CPU) 66 communicates with a memory through a bus 70. A reserved portion memory 68 contains the program that directs the CPU 66 to control the locomotive depending on the several inputs that will be discussed later. The memory also contains a section allowing temporary storage of data used by the CPU when handling hardware events.

The current locomotive status and the commands issued from the remote transmitter are directed to the CPU through an interface 72 communicating with the bus 70. The interface 72 receives input signals from the following sources:

a) A speed direction sensor 74 providing locomotive velocity and direction of movement data;

b) A speed sensor 76 providing solely locomotive velocity data. The speed sensor 76 provides the CPU 66 with redundant velocity data allowing the CPU 66 to detect a possible failure of the main speed sensor 74.

c) A pressure sensor 78 observing the air pressure in the locomotive brake system;

d) A pressure sensor 79 observing the air pressure in the main reservoir;

e) A pressure sensor 80 observing the air pressure in the train brake system;

f) A sensor 82 observing the flow rate of air in the brake system of the train; and g) The decoded locomotive status word generated by the receiver 48.

Figure 12:
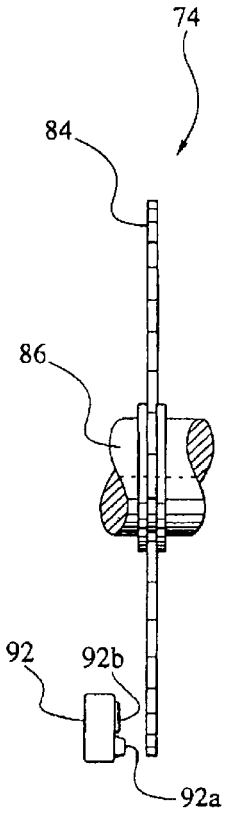
FIG. 12 is a side elevational view of the velocity sensor shown in FIG. 11.
Figure 11:
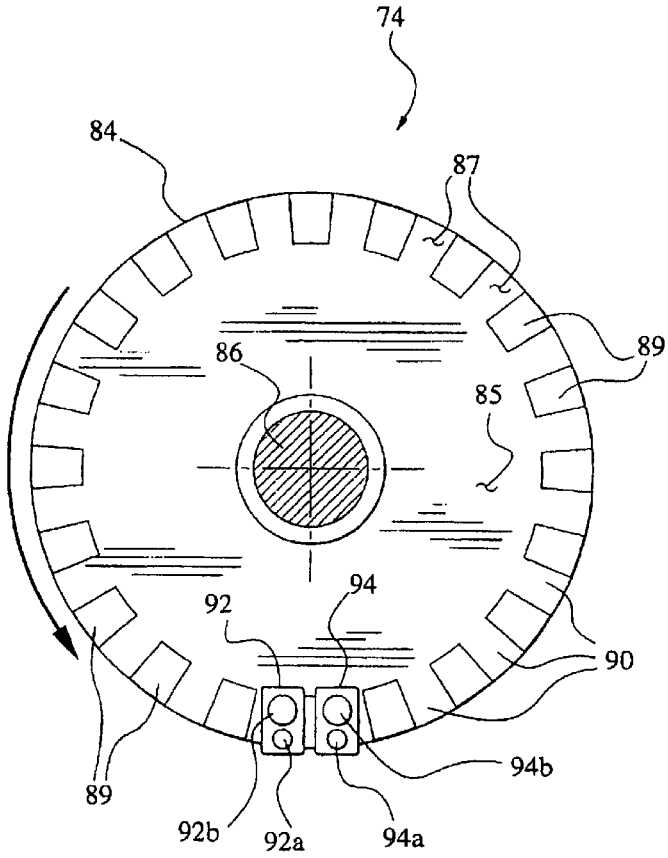
FIG. 11 is a side elevational view of a velocity sensor for generating a pulse signal whose frequency is correlated to the speed of the locomotive.

The structure of the speed/direction sensor 74 is illustrated in FIGS. 11 and 12. The sensor includes a disk 84 mounted to an axle 86 of the locomotive. When the locomotive is moving the disk 84 turns at the same angular speed as the axle 86. The disk 84 is provided with a layer of reflective coating 85 deposited to form on the periphery of the disk equidistant and alternating reflective zones 87 and substantially non-reflective zones 89. A pair of opto-electric sensors 92 and 94 are mounted in a spaced apart relationship adjacent the periphery of the disk 84. The sensor 92 comprises an emitter 92a generating a light beam perpendicular to the plane of the disk 84, and a receiver 92b producing an electric signal when sensing the reflection of the light beam on the reflective zones 87. However, when a substantially non-reflective surface 89 registers with the sensors 92, the output of the receiver is null or very low. The structure and operation of the opto-electric sensor 94 is identical to the sensor 92. Thus, the sensor 94 comprises an emitter 94a and a receiver 94b.

The spacing between the opto-electric sensors 92 and 94 is such that they generate output pulses due to the periodic change in reflectivity of the disk surface, occurring at different instants in time. As best shown in FIG. 10, and assuming that the disk 84 rotates in the counter clockwise direction, when the sensor 92 switches on as a result of a reflective zone 87 registering with the emitter 92a and the receiver 92b, the sensor 94 is still in a stable on condition and can be caused to switch off only by further rotating the disk 84.

Preferably, the disk 84 and the sensors 92 and 94 are mounted in a hermetically sealed housing to protect the assembly against contamination by water or dirt.

Figure 13:
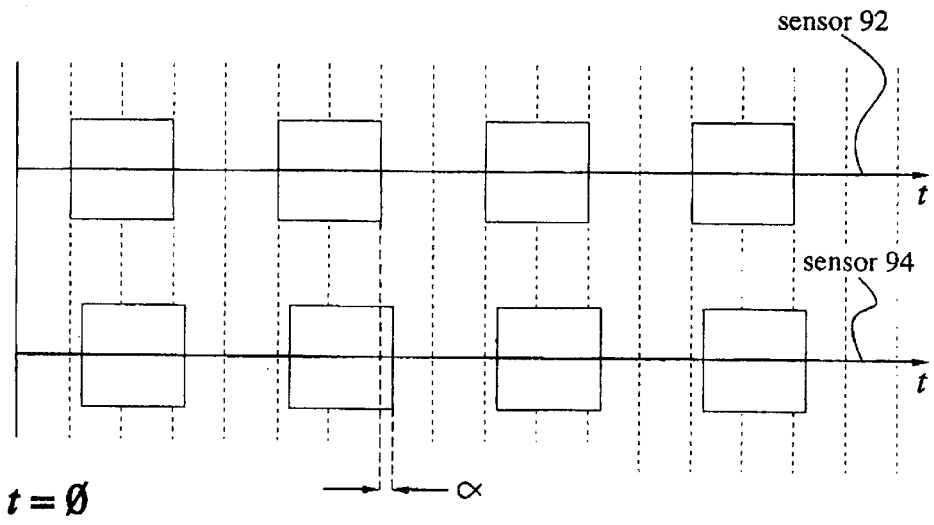
FIG. 13 illustrates the pulse output of the velocity sensor shown in FIGS. 11 and 12.

FIG. 13 illustrates the signal waveforms produced by the opto-electric sensors 92 and 94. Both outputs are pulse trains having the same frequency but out of phase by an angle $\alpha$ which depends upon the spacing of the sensors 92 and 94. When the locomotive moves forward the disk 84 rotates in a given direction, say clockwise. In this case, the pulse train from sensor 94 leads the pulse train from sensor 92 by angle $\alpha$. When the locomotive is in reverse, then the output of sensor 92 leads the output of sensor 94 by angle $\alpha$ (this possibility is not shown in FIG. 13). The processing unit 50 observes the occurrence of the leading pulse edges from the sensors 92 and 94 with relation to time to determine the identity of the leading signal, which allows derivation of the direction of movement of the locomotive.

Velocity data is derived by measuring the rate of fluctuation of the signal from any one of sensors 92 and 94. It has been found practical to determine the velocity at low locomotive speeds by measuring the period of the signal. However, at higher speeds the frequency of the signal is being measured since the period shortens which may introduce non-negligible measurement errors.

The speed sensor 76 is similar to sensor 74 described above with two exceptions. First, a single opto-electric sensor may be used since all that is required is velocity data. Second, the speed sensor 76 is mounted to a different axle of the locomotive.

The pressure sensors 78 and 79 are switches mounted to the main reservoir and to the pneumatic line that supplies working fluid to the locomotive independent braking mechanism, and produce an electric signal in response to pressure. These sensors merely indicate the presence of pressure, not its magnitude. In essence, each sensor produces an output when the air pressure exceeds a preset level, indicating whether the reserve of compressed air is sufficient for reliable braking. Unlike the sensors 78 and 79, the pressure sensor 80 is a transducer that generates a signal indicative of presence and magnitude of pressure in the train brake air line.

The airflow sensor 82 observes the volume of air circulating in the pneumatic lines of the train brake system. The results of this measurement along with the output of pressure sensor 78 provide an indication of the state of charge of the pneumatic network. It is considered normal for a long pneumatic path to experience some air leaks due primarily to imperfect unions in pipe couplings between cars of the train. However, when a considerable volume of air leaks, the airflow sensor 82 enables the processing unit to sense such condition and to implement corrective measures, as will be discussed later.

The interface 72 receives the signals produced by the sensors 74, 76, 78, 79, 80, and 82 and digitizes them where required so they can be directly processed by the CPU 66. The locomotive status word issued by the receiver 48 requires no conversion since it is already in the proper binary format.

The binary signals generated by the CPU 66 that control the various functions of the locomotive are supplied through the bus 70 and the interface 72. The following control signals are being issued:

a) A signal 98 to set the lights of the locomotive to off/low intensity/high intensity. The signal is constituted by one (1) bit, each operative condition of the locomotive lights being represented by a different bit state;

b) A two (2) bit signal 100 to operate the bell or the horn or the locomotive;

c) A five (5) bit signal 102 for traction control. Four bits are used to communicate the throttle settings (only eight (8) settings are possible) and one bit for the power contacts of the electric traction motors;

d) An eight (8) bit signal 104 for train brake control. The number of bits used allows 256 possible brake settings; and e) A seven (7) bit signal 106 for independent brake control. The number of bits used allows 128 possible brake settings.

The interface 72 will covert at least some of the signals 98, 100, 102, 104, and 106 from the binary form to a different form that the devices at which the signals are directed can handle. This is described in more detail below.

The actuators for the lights and bell/horn are merely switches such as relays or solid state devices that energize or de-energize the desired circuit. The interface 72, in response to the CPU 66 instruction to set the lights/bell/horn in the desired operative position, will generate an electric signal that is amplified by the driver unit 52 and then directed to the respective relay or solid state switch.

With regard to the traction control it should be noted that most locomotive manufacturers will install on the diesel/electric engine as original equipment a series of actuators that control the fuel injection, power contracts and brakes among others, hence the tractive power that the locomotive develops. This feature permits coupling several locomotives under control of one driver. By electrically and pneumatically interconnecting the actuators of all the locomotives, the throttle commands the driver issues in the cab of the mother engine are duplicated in all the slave locomotives. The locomotive remote control system in accordance with the invention makes use of the existing throttle/brake actuators in order to control power. The interface 72 converts the binary throttle settings issued by the CPU 66 to the standard signal protocol established by the industry for controlling throttle/brake actuators. This feature is particularly advantageous because the locomotive remote control system does not require the installation of any throttle/brake actuators. As in the case of the lights and bell/horn signals 98 and 100, respectively, the traction control signal 102 incoming from the interface 72 is amplified in the driver unit 52 before being directed to the throttle/brake actuators.

The train brake control signal 104 issued by the interface 72 is an eight (8) bit binary sequence applied to a valve mounted in the train brake circuit to modulate the air pressure in the train line that controls the braking mechanism. The working fluid is supplied from a main reservoir whose integrity is monitored by the pressure sensor 79 described above. The independent locomotive brake is controlled in the same fashion with binary signal 106.

The operation of the locomotive control system will now be described with more detail.

SPEED CONTROL TASK

The flowchart of the speed control logic is shown in FIGS. 14a to 14d. The program execution begins by reading the velocity data generated from sensors 74 and 76 that are mounted at different axles of the locomotive. The data gathered from each sensor is stored in the memory 68 and then compared at step 124. If both sensors are functioning properly they should generate identical or nearly identical velocity values. In the event a significant difference is noted the CPU 66 concludes that a malfunction exists and issues a command (step 126) to fully apply the independent brake in order to bring the locomotive to a complete stop.

Assuming that no mismatch between the readings of sensors 74 and 76 is detected, the CPU 66 will compare the observed locomotive speed with the speed requested by the operator. The later variable is represented by a string of three (3) bits in the locomotive status word (the flowchart of FIGS. 14a to 14d assumes that the locomotive status word has been correctly received, has the proper identifier and has been stored in the memory 68). The operator can select on the portable transmitter 10 eight possible speed settings, each setting being represented by a different binary sequence. The speed settings are as follows:

1) STOP
2) COAST WITH BRAKE
3) COAST
4) COUPLE (1 MILE PER HOUR (MPH))
5) 4 MPH
6) 7 MPH
7) 10 MPH
8) 15 MPH

If any one of settings 4 to 8 have been selected, which require the locomotive to positively maintain a certain speed, the CPU 66 will effect a certain number of comparisons at steps 128 and 130 to determine if there is a variation between the actual speed and the selected speed along with the sign of the variation, i.e. whether the locomotive is overspeeding or moving too slowly. More particularly, if at step 128 the CPU 66 determines that the observed speed is in line with the desired speed no corrective measure is taken and the program execution initiates a new cycle. On the other hand, if the actual speed differs from the setting, the conditional test 130 is applied to determine the sign of the difference. Under a negative sign, i.e. the locomotive is moving too slowly, the program execution branches to processing thread A (shown in FIG. 14b). In this program segment the CPU 66 will determine at step 132 the velocity error by subtracting the actual velocity from the set point contained in the locomotive status word. A proportional plus derivative plus integral algorithm is then applied for calculating throttle setting intended for reducing the velocity error to zero. Essentially the CPU 66 will calculate the sum of the integral of the velocity error signal (calculated in step 145), of the derivative of the velocity error signal (calculated in step 147), and of a proportional factor (calculated in step 143). The latter is the velocity error signal multiplied by a predetermined constant. The result of this calculation provides a control signal that is used for modulating the throttle actuator of the locomotive through output signal 102 of the interface 72.

Figure 15A:
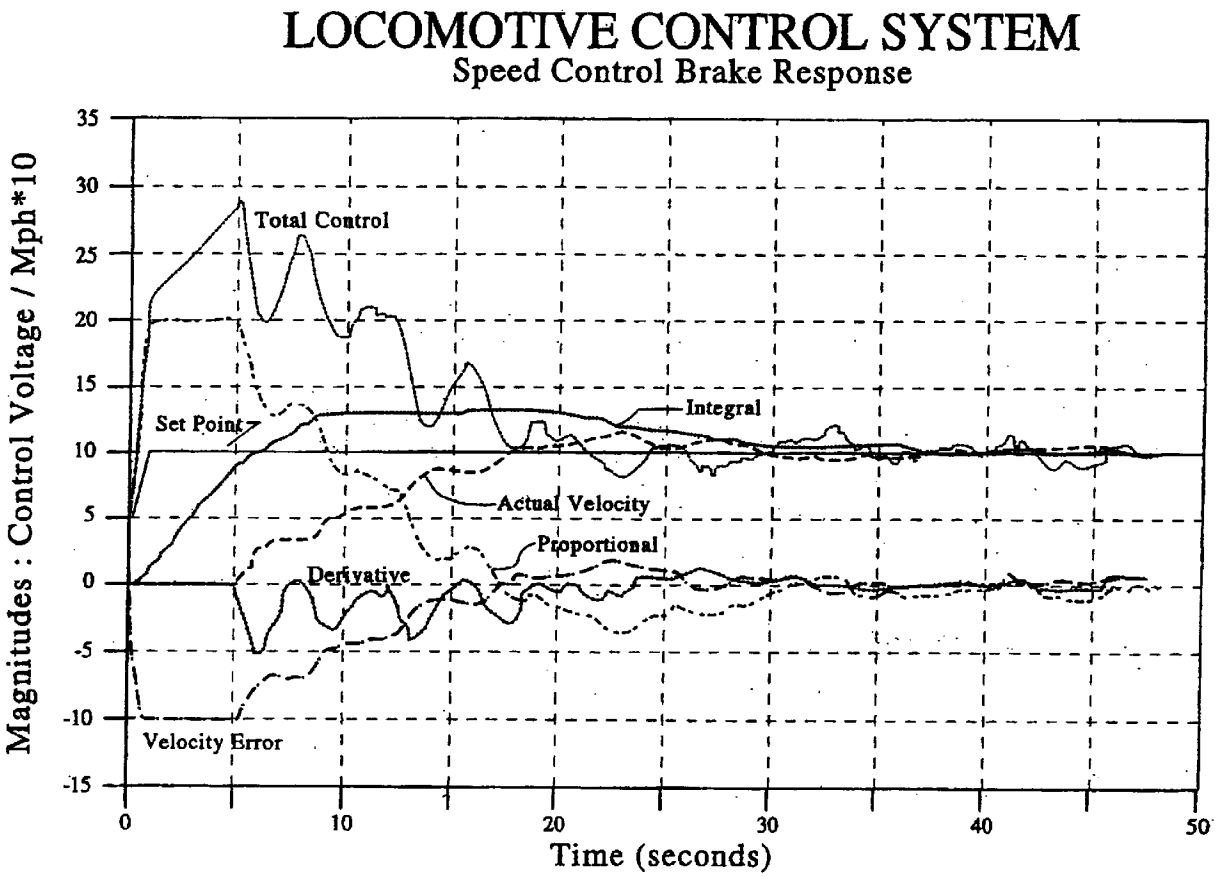
FIGS. 15a and 15b are diagrams illustrating the variation with respect to time of the velocity of the locomotive and of variables used to calculate a throttle or brake correction signal.

FIG. 15a is a diagram illustrating the variation of the current velocity signal, the set point, the velocity error, the velocity error integral, the velocity error derivative and velocity error proportional with respect to time.

Figure 14A:
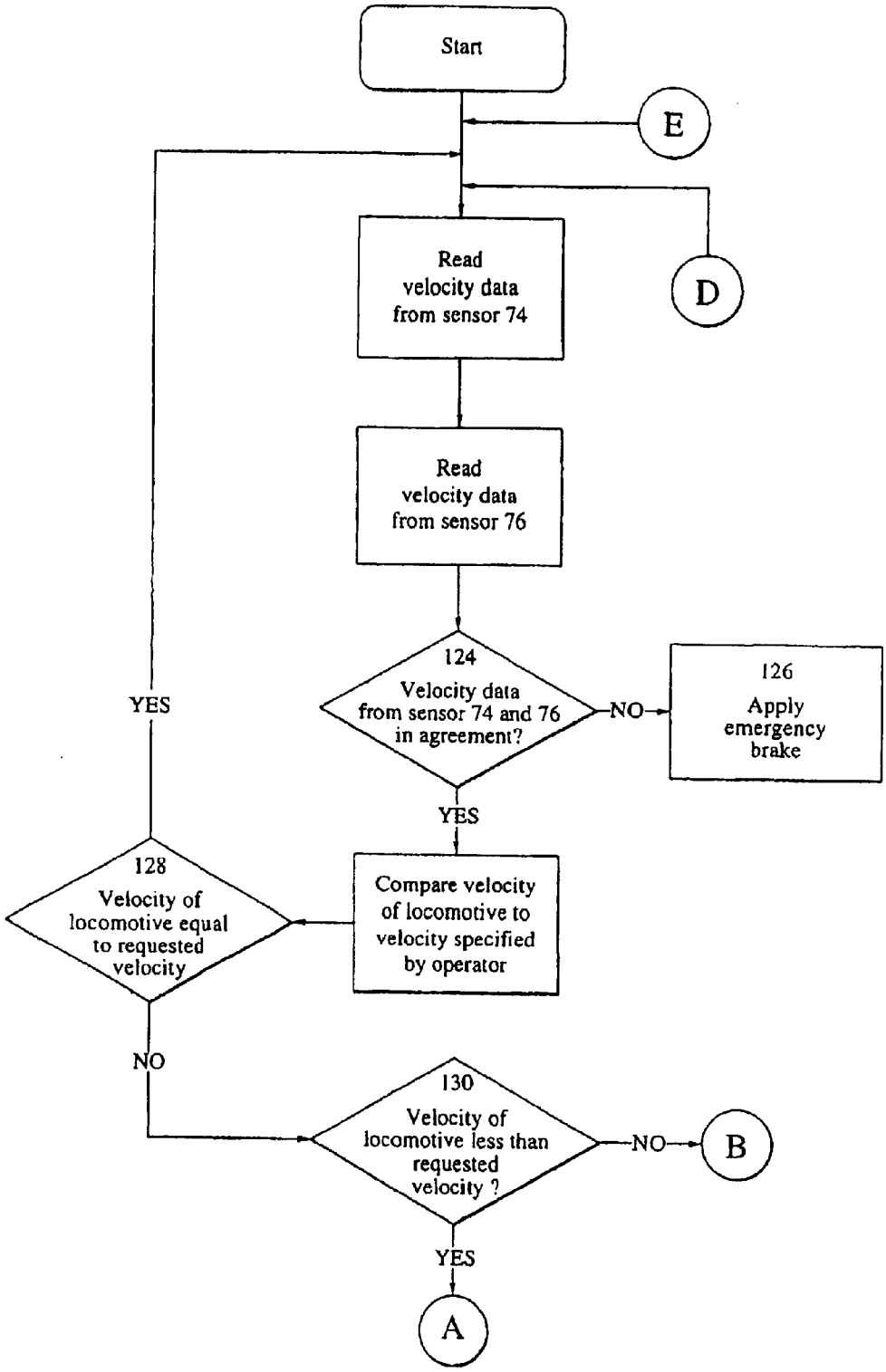
FIGS. 14a to 14d are a flow charts of the logic implemented to control the speed of the locomotive.
Figure 14B:
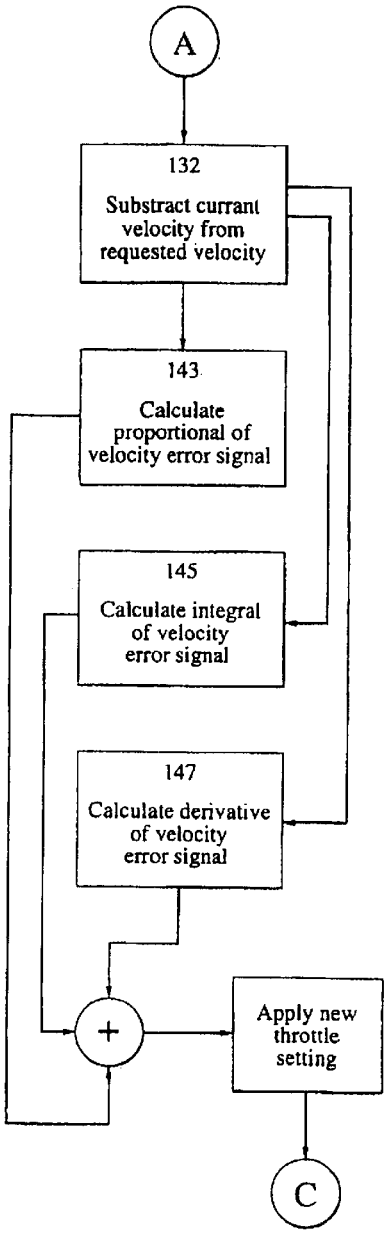
Figure 14C:
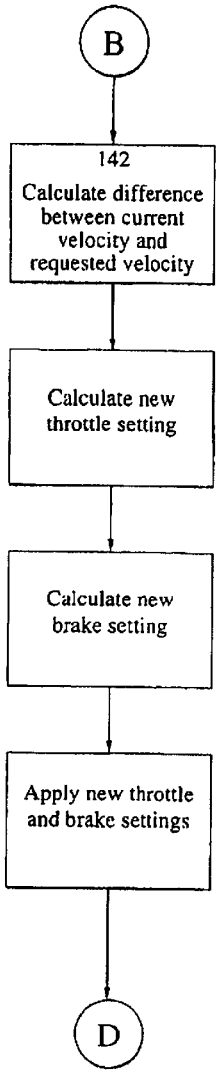
Figure 14D:
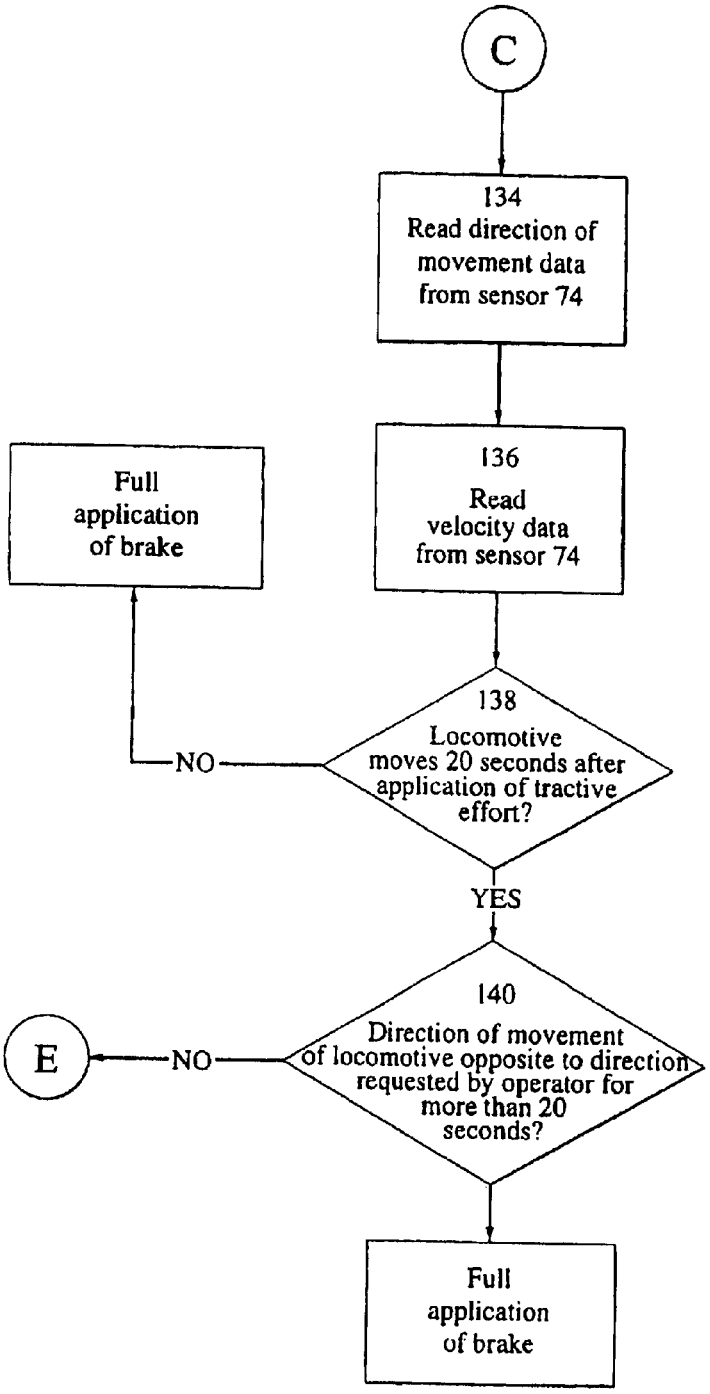

With reference to FIG. 14d, when the new throttle setting has been implemented the program execution continues to steps 134 and 136 where the current direction of movement and speed of the locomotive are determined from the reading of sensor 74. In the event the CPU 66 observes a zero speed value for a time period of more than 20 seconds in spite of the fact that a tractive effort is being applied (step 138), it declares a malfunction and fully applies the independent locomotive brake. Normally, when a tractive effort is applied it causes the locomotive to accelerate. The movement, however, may occur after a certain delay following the application of the tractive effort especially if the locomotive is pulling a heavy consist. Still, if after a certain time period no movement is observed, some sort of malfunction is probably present. One possibility is that both sensors 74 and 76 have failed and register zero speed even when the locomotive is rolling. This is highly unlikely but not impossible. When such condition is encountered the CPU 66 immobilizes the locomotive immediately upon determination that a fault is present.

The 20 seconds waiting period before application of the independent brake is implemented by verifying the velocity data from sensor 74 during a certain number of program execution cycles. For instance, the current velocity value is compared to the velocity value observed during the previous execution cycle that has been stored in the memory 68. If a change is noted, i.e. the locomotive moves, then the step 138 is considered to have been successively passed. If, however, after 200 execution cycles that require about 20 seconds to be completed, no change with the previously observed velocity value is noted, the independent brake is fully applied.

Assuming that motion of the locomotive is detected at step 138, the program proceeds to step 140 where the direction of movement of the locomotive read from the output of sensor 74 is compared to the direction of movement specified by the operator. This value is represented by a four (4) bit string in the locomotive status word. If the locomotive is moving rearwardly while the operator has specified a forward movement, the CPU 66 detects a condition known as "rollback". Such condition may occur when the locomotive is starting to move upwardly on a grade while pulling a heavy consist. Under the effect of gravity the train may move backward for a certain distance until the traction system of the locomotive has been able to build-up the pulling force necessary to reverse the movement. During a rollback condition the electric current in the traction motors of the locomotive increase beyond safe levels. Hence it is desirable to limit the rollback in order to avoid damaging the hardware. The program is designed to tolerate a rollback condition for no longer than 20 seconds. If the condition persists beyond this time period the independent brake is fully applied. The 20 seconds delay is implemented by comparing the evolution of the results of the comparison step 140 with the results obtained during the previous execution cycle; if the results do not change for 200 program execution cycles that require about 20 seconds of running time on the CPU 66, a fault is declared and the brake applied.

In the case where both tests 136 and 140 are successively passed, i.e. the locomotive is moving in the selected direction, the program execution returns to the beginning of the cycle as shown in FIG. 14a.

Figure 15B:
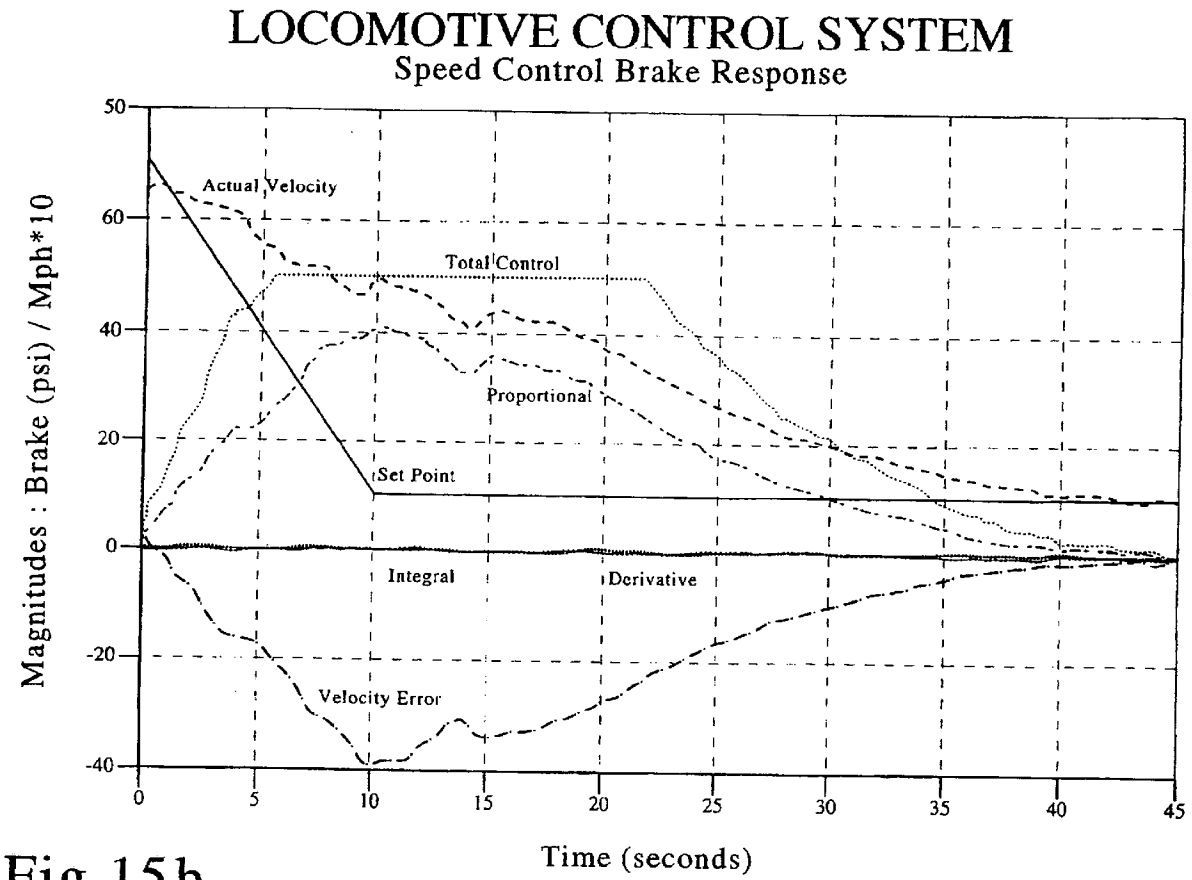

Referring back to step 130, if the conditional branch points toward processing thread B (see FIGS. 14a and 14c), which means that the locomotive is overspeeding, then the CPU 66 will calculate at step 142 the difference between the selected speed and the observed speed. The resulting error signal is then processed by using the proportional plus derivative plus integral algorithm described above to derive a new throttle setting. If by controlling the throttle (reducing the tractive effort developed by the engine) speed correction cannot be achieved, the brake is applied. The brake is modulated by using a proportional plus derivative plus integral algorithm. FIG. 15b illustrates the brake response, along with the actual brake, error, proportional, derivative, and integral signals with relation to time. The calculated brake setting is issued as binary signal 106 (see FIG. 10) that is directed to the braking mechanism on the locomotive.

The STOP, COAST WITH BRAKE and COAST settings will now be briefly described. The STOP setting, as the name implies, intends to bring and maintain the locomotive stationary. When the CPU 66 receives a locomotive status word containing a speed setting corresponding to STOP it immediately terminates the tractive effort and applies the independent locomotive brake at a controlled rate.

Figure 16A:
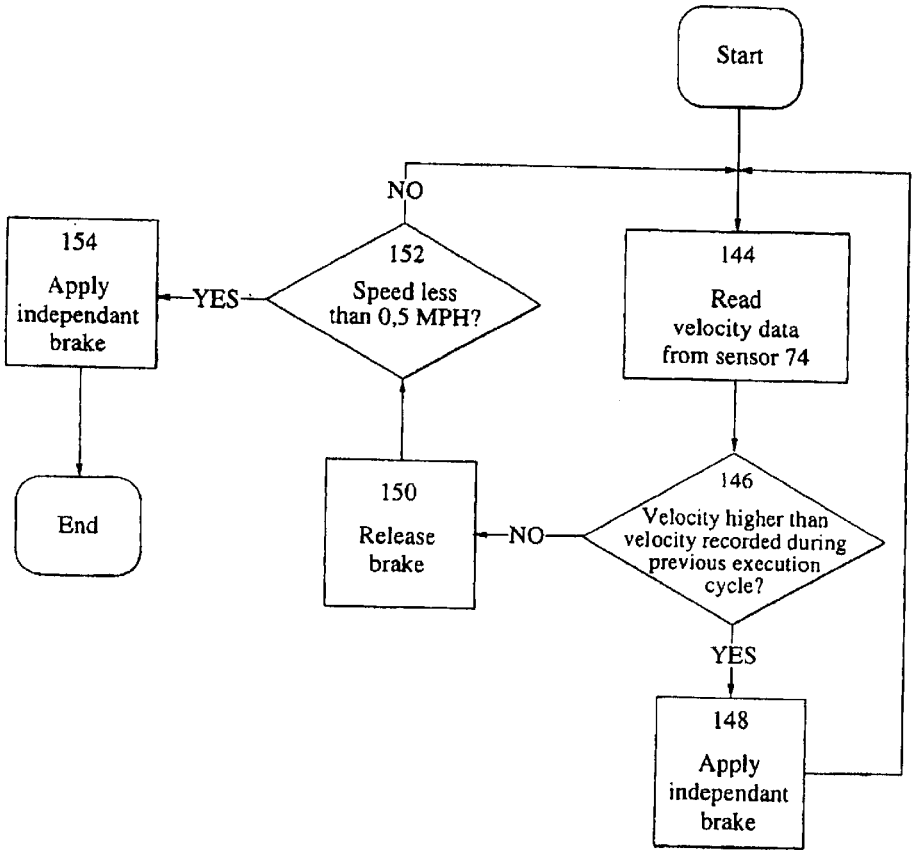
FIG. 16a is a flow chart illustrating the logic for controlling the speed of the locomotive in a COAST speed setting.
Figure 16B:
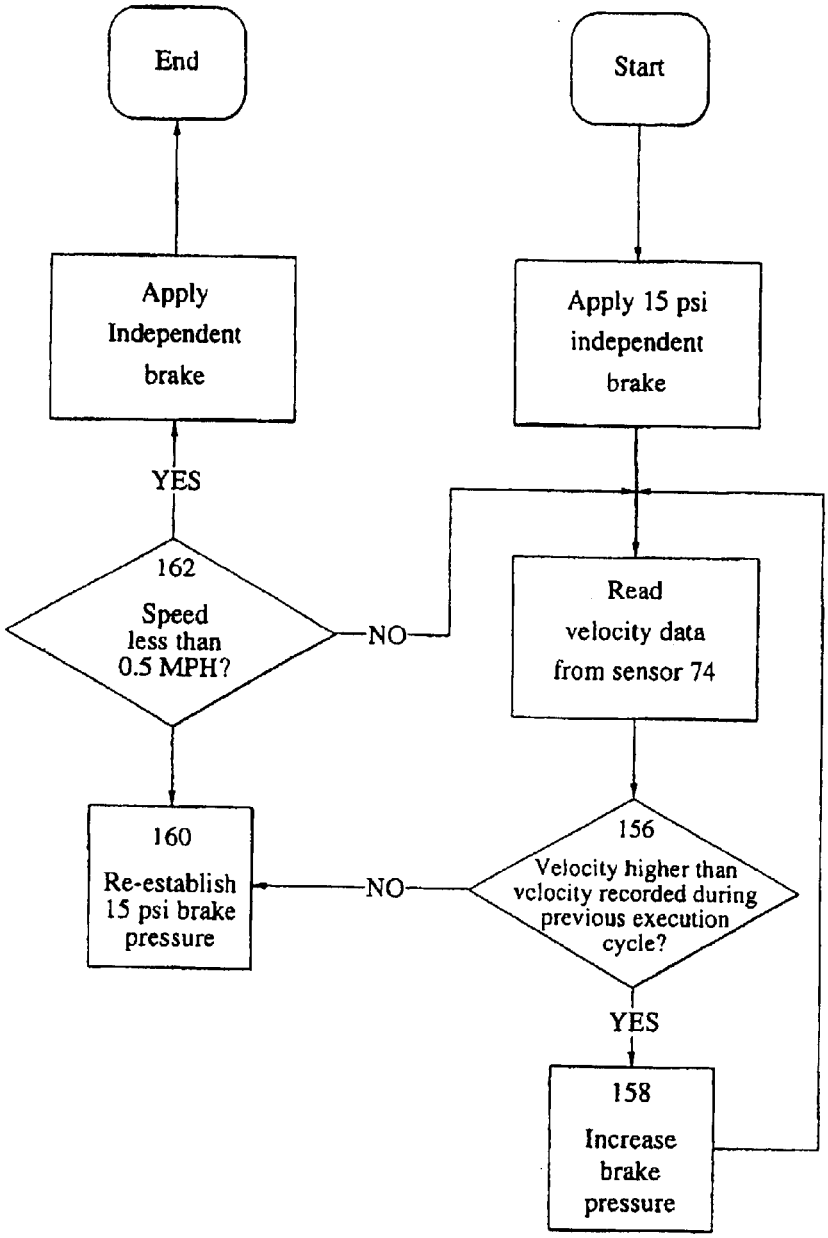
FIG. 16b is a flow chart illustrating the logic for controlling the speed in COAST WITH BRAKE setting.

The program logic to implement the COAST and COAST WITH BRAKE services is illustrated as flowcharts in FIGS. 16a and 16b, respectively. When the multi-position lever 14 is set to the COAST setting the program reads the velocity data from sensor 74 at step 144 and then compares it at step 146 to the velocity value recorded during the previous program execution cycle. If the consist accelerates under the effect of gravity down a grade (no tractive effort is applied by the system in the COAST and COAST WITH BRAKE settings) the observed velocity will show an increase. The CPU 66 will then apply the independent locomotive brake to slow the consist at step 148. The brake is modulated by using a proportional plus integral plus derivative (PID) algorithm. In the event that no velocity increase is observed the CPU 66 may set (depending upon the control signal resulting from the PID calculation) the independent brake to the release position at step 150 or keep the brake at the current setting.

The next step in the program execution is a test 152 which determines if the speed of the consist is below 0.5 MPH. In the affirmative the movement is stopped by full application of the independent brake at step 154. If the speed of the consist exceeds or is equal to 0.5 MPH then the program returns to step 144.

The COAST WITH BRAKE function, depicted in FIG. 16b is very similar to the COAST service described above. The only difference is that a minimum independent brake pressure of 15 pounds per square inch (psi) is always maintained. At step 156 the acceleration of the consist is determined by comparison of the current velocity with a previous velocity value. If a positive acceleration is observed, such as when the consist moves down a grade, the brake pressure is increased at step 158 (the control is made by a PID algorithm). During the next program execution cycle the acceleration is determined again. If no positive acceleration is sensed the brake pressure is returned to 15 psi at step 160. At step 162 the velocity of the consist is tested against the 0.5 MPH value. If the current speed is less than this limit a full independent brake application is effected in order to stop the consist, otherwise the program execution initiates a new cycle.

EXCHANGE OF COMMAND AUTHORITY BETWEEN REMOTE TRANSMITTERS

Figure 17A:
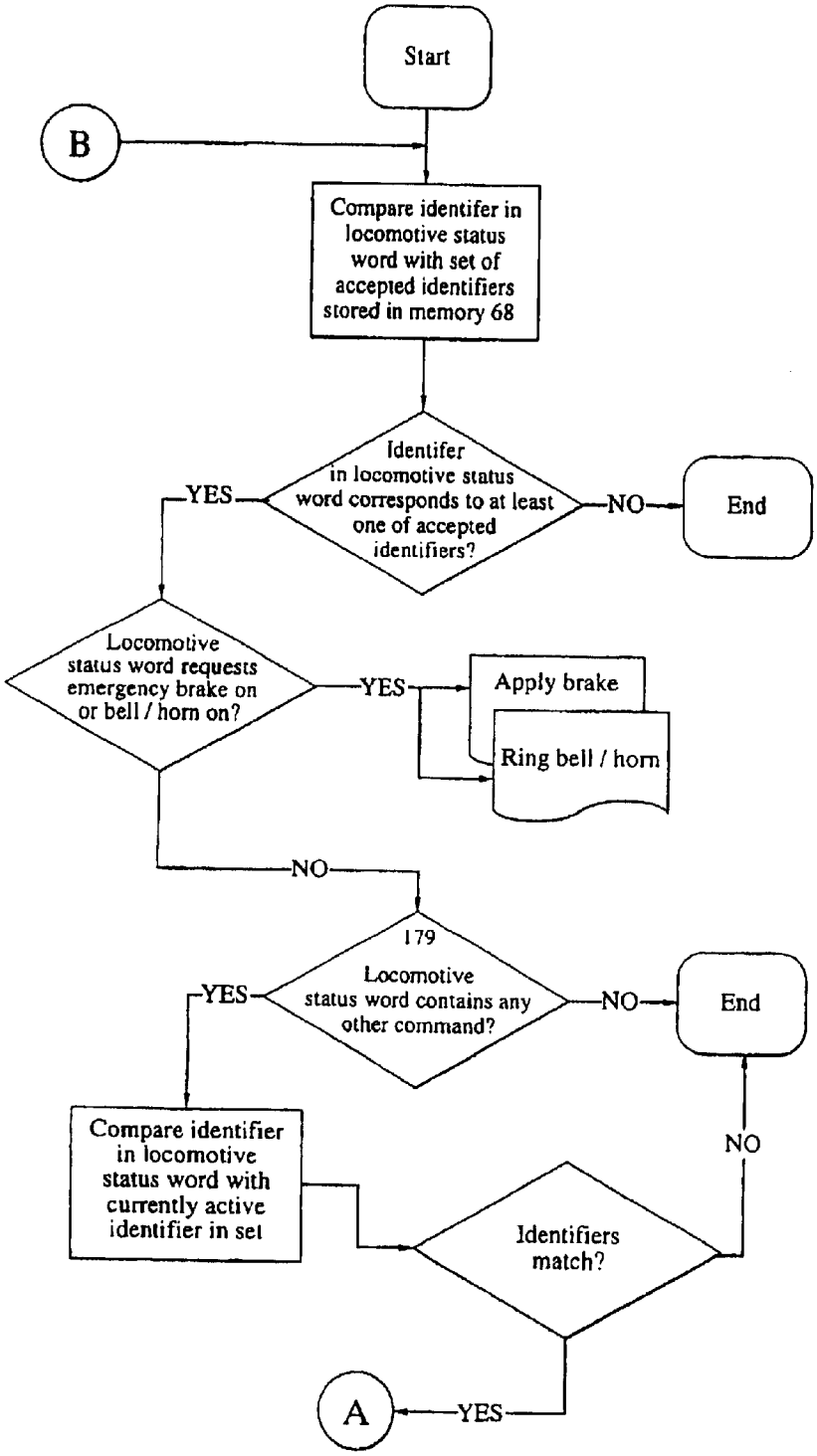
FIGS. 17a and 17b are flow charts of the logic for transferring the command authority from one remote control transmitter to another.
Figure 17B:
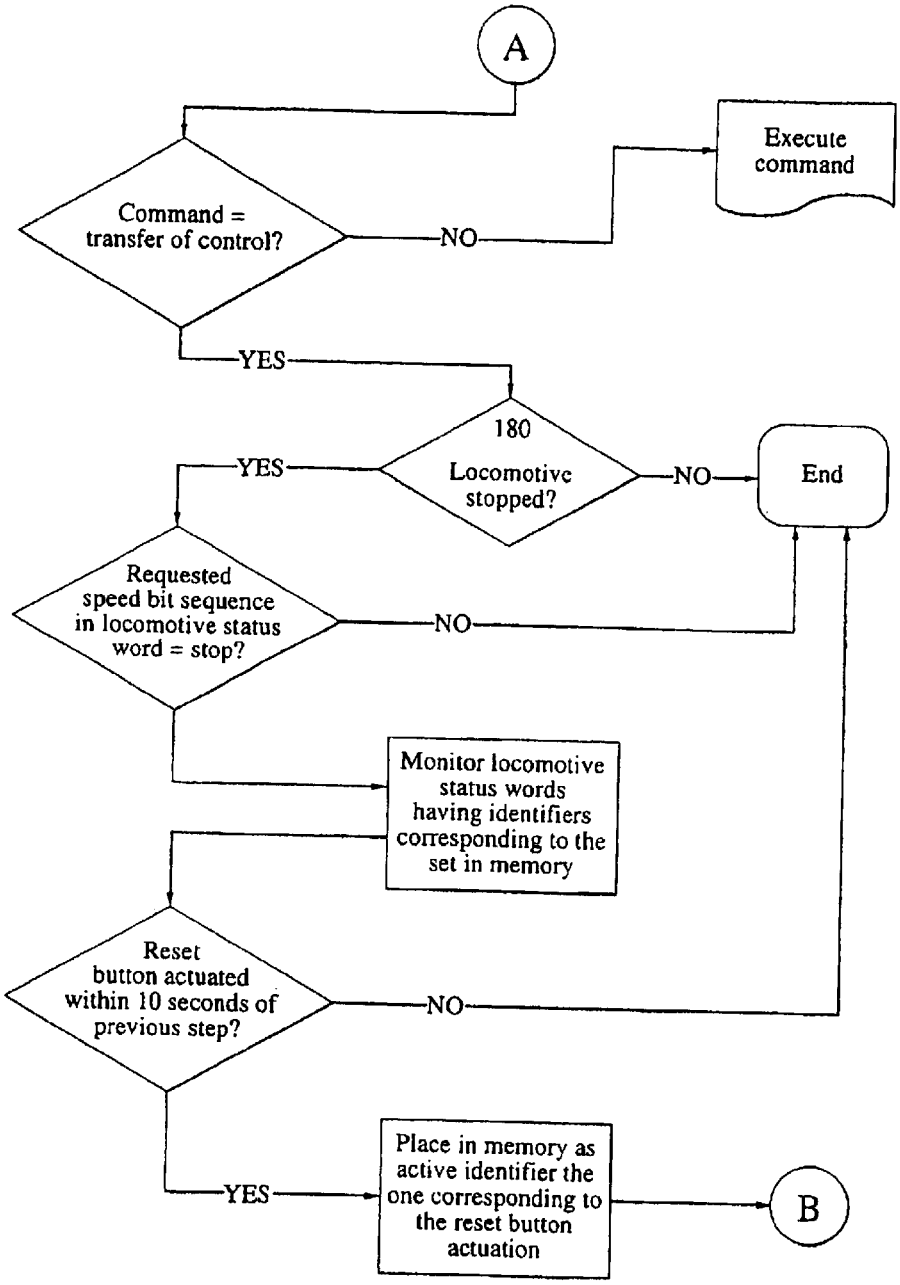

In some instances a single operator may effectively and safely control a consist that includes a limited number of cars remaining at all times well within the visual range of the operator. However, when the consist is long two operators may be required, each person being physically close to and monitoring one end of the train. The present invention provides a locomotive control system capable of receiving inputs from the selected one of two or more remote transmitters. In a two-operator arrangement, each person is provided with a portable transmitter 10 able to generate the complete range of locomotive control commands. In order to avoid confusion, however, the slave controller on-board the locomotive will accept at any point in time commands from a single designated transmitter. The only exception is a limited set of emergency and signalling commands that are available to both operators. The control function can be transferred from one transmitter to the other by following the logic depicted in the flowchart of FIGS. 17a and 17b.

Upon reception of a locomotive status word, the CPU will compare the identifier in the word to a list of two or more possible identifiers stored in the memory 68. The list of acceptable identifiers contains the identifiers of all the remote transmitters permitted to assume control of the locomotive. If the identifier in the locomotive status word does not correspond to any one of the identifiers in the list, then the system rejects the word and takes no action. Otherwise, the system will determine what are the requested functions that the locomotive should perform. If the locomotive status word requests application of the emergency brake or sounding the bell or horn, then the system complies with the request. Otherwise (step 179), if a new speed setting is requested for example, the system will comply only if the identifier in the locomotive status word matches a specific identifier in the list that designates the remote transmitter currently holding the command authority. If this step is verified, then the locomotive executes the command unless the command is a request to transfer command authority to another remote controller. The CPU 66 recognizes this request by checking the state of the bit reserved for this function in the locomotive status word. If the state of the bit is 1 (command transfer requested) the program execution continues at step 180 where the CPU 66 will perform a certain number of safety checks to determine if the command transfer can be made in a safe manner. More particularly, the CPU will determine if the locomotive is stopped and if the brake safety checks (to be described later) are verified. If the locomotive is moving or the brake safety checks fail, then no action is taken and the command remains with the portable transmitter currently in control. If this test is passed, then the CPU will monitor the reset bit of all the locomotive status words received that carry an identifier in the list stored in the memory 68 (the reset bit issued by the transmitter currently holding the controls is not considered). If within 10 seconds of the reception of the request to transfer control from the current transmitter the CPU observes a reset bit in the high position, which means that the operator of a remote transmitter in the pool of candidates able to acquire control has depressed the reset button, then the CPU 66 shifts in memory the identifier associated with the reset bit at high to the position of the current control holder. From now on the CPU 66 will accept commands (except the safety related functions of emergency brake and sounding the bell/horn) only from the new authority. The procedure of checking the reset bit is used for safety purposes in order to transfer the control of the locomotive only when the target remote controller has effectively acknowledged acceptance of the control.

If within the 10 seconds no reset bit is set to the high position, the CPU 66 will abort the transfer function and resume normal execution of the program.

BRAKE SAFETY CHECKS

Figure 18:
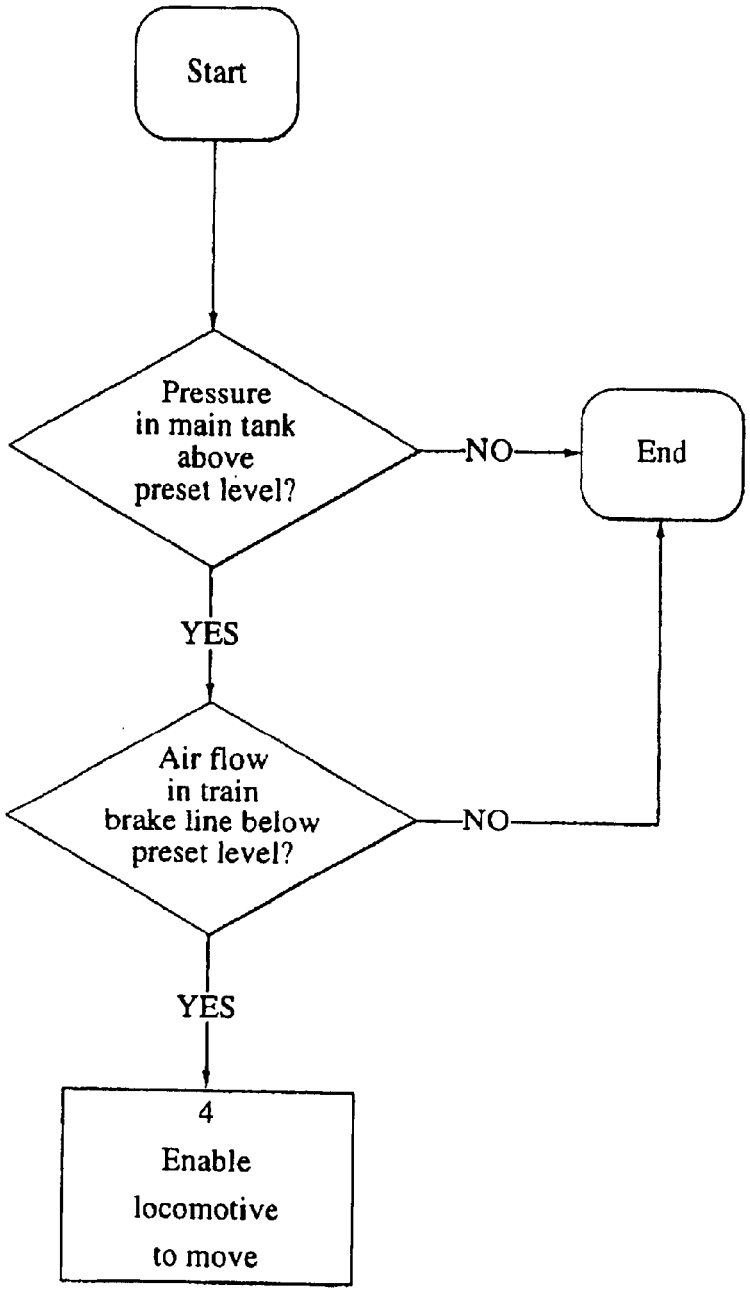
FIG. 18 is a flow chart of the safety diagnostic routine performed on the braking system of the locomotive.

FIG. 18 is a flow chart of a program segment used to identify the state of readiness of the braking system before authorizing movement of the locomotive. When a command is received to move the locomotive forward, the CPU 66 will check the pressure in the main tank that supplies compressed air to both the independent locomotive and to the train brake. If the pressure is below a preset level, the command to move the locomotive forward is aborted and no action is taken. A second verification step is required to allow movement of a locomotive which is a measurement of the flow rate of compressed air in the train brake line. The traction control signal 102 is issued only when the compressed air flow rate is below a predetermined level. As briefly discussed earlier, it is normal for a train brake line to exhibit a certain leakage due to imperfect couplings in unions between cars. However, when this leakage exceeds a predetermined level, either there is a major leak or the system is discharged and it is currently being pumped with air. In both cases the train should not be operated for obvious safety reasons.

The scope of the present invention is not limited by the description, examples and suggestive uses herein as modifications and refinements can be made without departing from the spirit of the invention. Thus, it is intended that the present invention covers the modifications and variations of this invention provided they come within the scope of the appended claims and their equivalents.

What is claimed is:

[1. A remote control system in connection with a locomotive including a main tank with compressed air under pressure, a pneumatic brake line in which compressed air flows, and a member applying tractive power, said remote control system comprising:

a) a transmitter for generating an RF signal; and b) a slave controller mounted on-board the locomotive, said slave controller having a first sensor responsive to the pressure of the compressed air in the main tank of the locomotive and a second sensor responsive to the flow of compressed air in the pneumatic brake line, said slave controller being responsive to outputs of said sensors to enable application of tractive power to the locomotive only when the pressure in the main tank is above a predetermined level and the flow of air in the pneumatic brake line is below a predetermined level.]

[2. A remote speed control system in connection with a locomotive that includes a main tank with compressed air, a pneumatic brake line in which compressed air flows, a throttle having a plurality of settings allowing tractive power regulation, and a brake system having a plurality of settings allowing braking power regulation, said speed control system comprising:

a transmitter generating an RF signal indicative of a desired speed of travel of the locomotive; and a slave controller mounted on-board the locomotive, said slave controller having:

a) receiver means for sensing said RF signal and providing data relative to the desired speed of travel of the locomotive, b) a first sensor responsive to the pressure of the compressed air in the main tank of the locomotive, c) a second sensor responsive to the flow of compressed air in the pneumatic brake line of the locomotive, and d) processor means for receiving said data relative to the desired speed of travel of the locomotive from said receiver means, said processor means responsive to said first sensor means, to said second sensor means, and to said data relative to the desired speed of travel for generating a throttle setting signal causing the throttle of the locomotive to acquire a selected setting when the pressure of the compressed air in the main tank is above a predetermined level and the flow of compressed air in the pneumatic brake line is below a predetermined level.]

[3. A remote speed control system in connection with a locomotive that includes a throttle having a plurality of settings allowing tractive power regulation and a brake system having a plurality of settings allowing braking power regulation, said speed control system comprising:

a transmitter generating an RF signal indicative of a desired speed of travel of the locomotive; and a slave controller mounted on-board the locomotive, said slave controller having:

a) receiver means for sensing said RF signal and providing data relative to the desired speed of travel of the locomotive, b) velocity sensor means for generating data representative of an actual speed of travel of the locomotive, and c) processor means for receiving data relative to the desired speed of travel of the locomotive from said receiver means and generating a throttle setting signal causing the throttle of the locomotive to acquire a selected setting and a brake setting signal causing the brake system of the locomotive to acquire a selected setting, said processor means being responsive to said velocity sensor means and to said data relative to the desired speed of travel and generating one of said throttle setting signal and said brake setting signal correlated to a difference between the desired speed of travel and the actual speed of travel of the locomotive to change the actual speed of travel of the locomotive and diminish that difference.]

[4. The invention as claimed in claim 3, wherein said processor means includes means for comparing said data relative to the desired speed of travel of the locomotive with said data representative of an actual speed of travel of the locomotive and generating an error signal correlated to the difference between the actual and desired speeds, said throttle setting signal being a linear combination of said error signal, its derivative, and its integral.]

[5. The invention as claimed in claim 3, wherein said processor means includes means for comparing said data relative to the desired speed of travel of the locomotive with said data representative of an actual speed of travel of the locomotive and generating an error signal correlated to the difference between the actual and desired speeds, said brake setting signal being a linear combination of said error signal, its derivative, and its integral.]

[6. The invention as claimed in claim 3, wherein said velocity sensor means includes a first velocity sensor generating a first signal representative of a speed of travel of the locomotive and a second velocity sensor generating a second signal representative of a speed of travel of the locomotive, said processor means being responsive to a discrepancy between said first and second speed of travel signals and issuing a brake setting signal causing the brake system of the locomotive to apply braking power.]

[7. The invention as claimed in claim 3, wherein said slave controller has means for generating data representative of a direction of travel of the locomotive.]

8. A remote coast control system in connection with a locomotive that includes a throttle having a plurality of settings allowing tractive power regulation and a brake system having a plurality of settings allowing braking power regulation, said coast control system comprising:

a transmitter generating an RF signal providing a coast command to the locomotive;

a slave controller mounted on-board the locomotive, said slave controller having:

a) receiver means for sensing said RF signal and providing said coast command, b) means for generating data representative of a velocity variation of the locomotive with relation to time, and c) processor means receiving said coast command from said receiver means and generating in response to said data representative of a velocity variation of the locomotive with relation to time one of (i) a brake setting signal causing the brake system of the locomotive to increase braking power when said velocity variation denotes a positive acceleration, and (ii) a brake setting signal causing the brake system of the locomotive to decrease braking power when said velocity variation denotes a negative acceleration, said processor means controlling the velocity of the locomotive without effecting any application of tractive power*; and*

*wherein said brake setting signal generated when said velocity variation denotes a negative acceleration represents a non-nil brake system setting, whereby braking power is applied to the locomotive at all times when said velocity variation denotes one of a positive and a negative acceleration.*

9. The invention as claimed in claim 8, wherein said brake setting signal is a linear combination of an error signal representing a difference between an actual velocity of the locomotive and a velocity of the locomotive measured at a previous moment, its derivative, and its integral.

10. The invention as claimed in claim 9, further comprising a velocity sensor measuring an actual speed of travel of the locomotive, said velocity sensor communicating actual speed of travel data to said processor means.

[11. The invention as claimed in claim 8, wherein said brake setting signal generated when said velocity variation denotes a negative acceleration represents a non-nil brake system setting, whereby braking power is applied to the locomotive at all times when said velocity variation denotes one of a positive and a negative acceleration.]

12. A remote control system in connection with locomotive that includes a throttle allowing tractive power regulation and a brake system allowing braking power regulation, said remote control system comprising:

a transmitter generating an RF signal providing a drive command that signals the locomotive to move in a first direction of travel;

a slave controller mounted on-board the locomotive, said slave controller having:

a) receiver means for sensing said RF signal and providing data indicative of said drive command, b) sensor means for *sensing a second direction of travel of the locomotive and* generating data representative of [a] *the second* direction of travel of the locomotive, and c) processor means receiving said data indicative of said drive command from said receiver means and generating a throttle signal causing application of tractive power to the locomotive, said processor means also receiving said data representative of [a] *the second* direction of travel of the locomotive from said sensor means and generating a brake signal causing application of the brakes *to stop the locomotive* when the locomotive moves in *said second direction of travel, said second direction of travel being* a direction other than said first direction of travel.

13. The invention as claimed in claim 12, wherein said processor means generates said brake signal causing application of the brakes *to stop the locomotive* when the locomotive moves in *the second direction of travel, said second direction of travel being* a direction other than said first direction of travel, after a predetermined amount of time has elapsed from the application of tractive power to the locomotive.

14. The invention as claimed in claim [12] *13*, wherein said predetermined amount of time is about 20 seconds.

15. A remote drive control system in connection with a locomotive with rollback protection, the locomotive including a throttle allowing tractive power regulation and a brake system allowing braking power regulation, said remote drive control system comprising:

a transmitter generating an RF signal providing a drive command that signals the locomotive to start moving in a first direction of travel;

a slave controller mounted on-board the locomotive, said slave controller comprising:

a) receiver means for sensing said RF signal and providing data indicative of said drive command, b) sensor means *for sensing an actual direction of travel of the locomotive and for* generating data representative of [an] *the* actual direction of travel of the locomotive, and c) processor means receiving said data indicative of said drive command from said receiver means and issuing a throttle signal causing application of tractive power to the locomotive, said processor means also receiving said data representative of [an] *the* actual direction of travel of the locomotive from said sensor means and generating a brake signal causing application of the brakes *to stop the locomotive* when the locomotive moves in *the actual direction of travel and the actual direction of travel is* a direction other than said first direction of travel, and a predetermined period of time has elapsed from the application of tractive power to the locomotive.

16. The invention as claimed in claim 15, wherein said predetermined period of time is about 20 seconds.

*17. A remote coast control system in connection with a locomotive that includes a throttle having a plurality of settings allowing tractive power regulation and a brake system having a plurality of settings allowing braking power regulation, said coast control system comprising:*

*a transmitter generating an RF signal providing a coast command to the locomotive;*

*a slave controller mounted on-board the locomotive, said slave controller having:*

*a) receiver means for sensing said RF signal and providing said coast command,*

*b) means for generating data representative of a velocity variation of the locomotive with relation to time, and*

*c) processor means receiving said coast command from said receiver means and generating in response to said data representative of a velocity variation of the locomotive with relation to time, while coasting in response to the coast command, one of (i) a brake setting signal causing the brake system of the locomotive to increase braking power when said velocity variation denotes a positive acceleration, and (ii) a brake setting signal causing the brake system of the locomotive to decrease braking power when said velocity variation denotes a negative acceleration, said processor means controlling the velocity of the locomotive without effecting any application of tractive power.*

*18. The remote coast control system as recited in claim 17 wherein, while said locomotive is coasting in response to the coast command, said processor means is operative to generate, in response to velocity data indicating a velocity below a predetermined speed, a brake setting signal causing the brake system of the locomotive to increase braking power to stop the locomotive.*

*19. The remote coast control system as recited in claim 18 wherein said predetermined speed is 0.5 miles per hour.*

*20. The remote coast control system as recited in claim 17, wherein said transmitter is further operative to convey a coast with brake command to said receiver means, said processing means being responsive to said coast with brake command to preclude application of tractive power to the locomotive and cause said brake system to be continuously applied during movement of the locomotive.*

* * * * *